United States Patent
Shimizu

[19]
[11] Patent Number: 5,886,844
[45] Date of Patent: Mar. 23, 1999

[54] MAGNETIC DISK APPARATUS AND READ WAVEFORM EQUALIZING METHOD USING STORED TAP COEFFICIENTS FOR A TRANSVERSAL FILTER

[75] Inventor: Shoichi Shimizu, Kawasaki, Japan

[73] Assignee: Fujitsu Limited, Kawasaki, Japan

[21] Appl. No.: 974,853

[22] Filed: Nov. 20, 1997

Related U.S. Application Data

[63] Continuation of Ser. No. 476,364, Jun. 7, 1995, abandoned.

[30] Foreign Application Priority Data

Sep. 29, 1994 [JP] Japan .................................. 6-234933

[51] Int. Cl.[6] .............................. G11B 5/035; G11B 5/09
[52] U.S. Cl. .............................. 360/65; 360/53; 375/230; 375/231
[58] Field of Search .................................. 360/46, 65, 53; 375/230, 232, 341, 231; 364/724.16

[56] References Cited

U.S. PATENT DOCUMENTS

| | | | |
|---|---|---|---|
| 4,707,841 | 11/1987 | Yen et al. ................................... | 360/51 |
| 5,008,761 | 4/1991 | Nishiyama et al. ....................... | 360/27 |
| 5,341,249 | 8/1994 | Abbott et al. .............................. | 360/53 |
| 5,353,310 | 10/1994 | Russell et al. ........................... | 375/101 |
| 5,369,667 | 11/1994 | Hara .......................................... | 375/12 |
| 5,467,232 | 11/1995 | Ouchi et al. ............................... | 360/65 |
| 5,590,205 | 12/1996 | Popovich ................................... | 381/71 |

FOREIGN PATENT DOCUMENTS

| | | |
|---|---|---|
| 62-116022 | 5/1987 | Japan . |
| 2-150114 | 6/1990 | Japan . |
| 2-168472 | 6/1990 | Japan . |
| 4-21904 | 1/1992 | Japan . |
| 5-225508 | 9/1993 | Japan . |
| 5-314654 | 11/1993 | Japan . |

*Primary Examiner*—Aristotelis M. Psitos
*Assistant Examiner*—Regina Y. Neal
*Attorney, Agent, or Firm*—Greer, Burns & Crain, Ltd.

[57] ABSTRACT

Prior to starting the use of an apparatus, an isolated waveform writing section writes a predetermined isolated waveform into a predetermined region of each track of a disk medium by designating a head number and a track number. The isolated waveform is subsequently read out by an isolated waveform reading section and is quantized by an analog/digital converter. Tap coefficients of a transversal filter are calculated by a tap coefficient calculating section. The tap coefficients calculated by the tap coefficient calculating section are stored in a memory on the basis of the track number and head number used when the isolated waveform is written. Upon reproduction during the use of the apparatus, a tap coefficient setting section reads out the corresponding tap coefficients from the memory on the basis of the track number and head number designated by a seek command and sets to the transversal filter.

22 Claims, 15 Drawing Sheets

FIG. 5

| HEAD ADDRESS | TRACK ADDRESS | C-3 C-2 C-1 C0 C1 C2 C3 |
|---|---|---|
| 0<br>0<br>0<br>⋮<br>0 | 000<br>001<br>002<br>⋮<br>1200 | |
| 1<br>1<br>1<br>⋮<br>1 | 000<br>001<br>002<br>⋮<br>1200 | |
| ⋮ | ⋮ | |
| 18<br>18<br>18<br>⋮<br>18 | 000<br>001<br>002<br>⋮<br>1200 | |

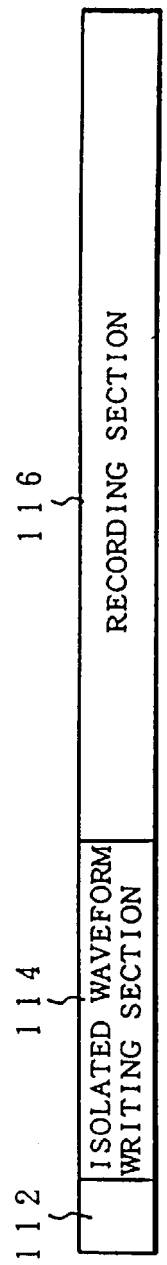
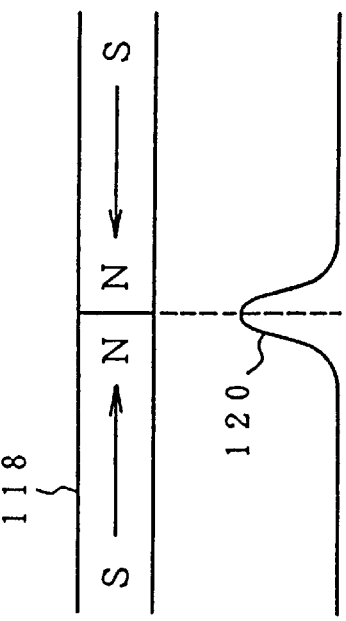

MAGNETIC DISK APPARATUS AND READ WAVEFORM EQUALIZING METHOD USING STORED TAP COEFFICIENTS FOR A TRANSVERSAL FILTER

This is a continuation of application Ser. No. 08/476,364 filed on Jun. 7, 1995 now abandoned.

BACKGROUND OF THE INVENTION

The invention relates to a magnetic disk apparatus and a read waveform equalizing method in which after a read waveform from a disk medium was equalized by using a transversal filter, bit data is detected in accordance with a Viterbi algorithm and, more particularly, to a magnetic disk apparatus and a read waveform equalizing method in which a transversal filter is controlled to an optimum state in accordance with a state of a disk medium.

In magnetic disk apparatuses, there are requests to realize a high density and a high speed. Such requests will be more and more increased in future. To satisfy the request to realize a high density, an improvement of a magnetic recording medium, an improvement of a magnetic head, a decrease in circuit noises, and the like are performed. In a magnetic disk apparatus of a type in which the magnetic head is floating from a disk, a floating amount of the magnetic head from the disk is also an important factor for realization of a high density. That is, when the floating amount of the head is decreased, an output and a resolution rise in accordance with the decreased floating amount. On the contrary, however, when a dust or the like enters between the head and the disk, a probability of the occurrence of a damage of the head is large and there is inevitably a limitation in the minimum value of the floating amount.

Therefore, in future, there is a limitation in the improvement of the output and resolution in the magnetic head—medium system. It is demanded to optimize a performance of an equalizer for equalizing a read waveform so that it can cope with a low S/N ratio and a low resolution.

Hitherto, in the magnetic disk apparatus, a waveform read out from a disk is analog differentiated and its zero-cross point is detected as a peak position. However, in a system of a low resolution, namely, a system in which isolated waves in a reproduction signal are neighboring, a peak shift such that the peak of a reproduction waveform is deviated from an actual peak of the isolated waveform appears in the reproduction waveform due to a waveform interference of the adjacent isolated waves. Thus, the reproduction waveform is erroneously seen as if information was written to the adjacent bits.

To prevent such a problem, as a method of improving such a drawback when data is read, a cosine equalizing circuit (pulse slimming circuit) is used to emphasize a high frequency component of a signal and improve a resolution. As a cosine equalizing circuit, there are a method of equalizing a waveform on a time domain and a method of equalizing a waveform on a frequency domain. The former method is generally used.

A cosine equalizing circuit for approximately performing a cosine equalization on a time base is constructed by a delay line of a delay time τ, a voltage divider, and a differential amplifier. When a read voltage is given to an input terminal, the voltage which was delayed by only the time t is applied to a (+) input of the amplifier. A voltage of a peak value (K) and a voltage of the peak value (K) having a delay of 2τ which was transmitted through the delay line and reflected by the differential amplifier and inputted are supplied to a (−) input, so that an addition synthesized output is obtained. Therefore, an output voltage of the cosine equalizing circuit is a voltage obtained by slimming the read waveform. By using such a cosine equalizing circuit, frequency characteristics in which a high frequency component is emphasized are obtained. However, when the high frequency component of the signal is emphasized, a wide band component of noises are also simultaneously emphasized, so that a jitter increases.

As a method of improving when data is written, there is also performed a write compensation such that a peak shift amount is predicted from the beginning and, at a time point when data is written to a medium, the data is alternately delayed or advanced, thereby narrowing a data interval than the actual waveform. However, a process to narrow the data interval is substantially the same as a process such that a recording density on the medium is raised and the data is written, resulting in decrease in S/N ratio and resolution.

Even in a system of a reduced resolution, therefore, a circuit or a method which can accurately read out the signal is necessary. A system in which a waveform interference exerts an influence on the adjacent bits can be regarded as a kind of convolution code. A Viterbi decoding method known as a maximum likelihood detecting method for the convolution code is used in the field of the magnetic recording.

Although the Viterbi decoding method is fundamentally advantageous in the system of a low resolution, in case of actually applying the Viterbi decoding method to the magnetic disk apparatus, there is a problem about how to fetch the value of the isolated waveform at a sampling point. Generally, recording densities at the inner and outer rims of the magnetic disk apparatus differ and shapes of isolated waveforms also differ. Therefore, in order to accurately perform the Viterbi detection, it is necessary to accurately fetch at a high speed the data of the isolated waveform on each track from the innermost rim to the outermost rim. The above problem is solved by providing a transversal filter as an equalizer for eliminating an intercede interference at the front stage of the Viterbi decoder.

Hitherto, as a magnetic disk apparatus using the Viterbi decoding method, for example, there is an apparatus disclosed in JP-A-5-314654. According to such an apparatus, an automatic equalizer is provided at the front stage of a Viterbi decoder, thereby performing an optimum equalization of the read waveform. The automatic equalizer has a transversal filter and optimizes tap coefficients by a learning function. When the tap coefficients are set, an output error of the automatic equalizer is obtained by using an equalization target pattern stored in a memory and the tap coefficients are controlled so as to minimize such an error.

As initial values of the tap coefficients which are set to the automatic equalizer, preset information is recorded every track or sector of a disk at the time of a shipping or a turn-on of a power source, and the preset information is read out and, in a manner similar to the case of the reproduction, tap coefficients which minimize an error with the equalization target pattern are obtained and stored in the memory. Just before the reproduction, the memory is accessed and the initial values of the tap coefficients are set to the automatic equalizer.

Such a method whereby the automatic equalizer and Viterbi decoder are combined is nothing but the technique of the communication field is applied as it is. In the communication field, for example, there is a time-dependent fluctuation of transmission path characteristics such as a frequency selective fading in a radio transmission. To eliminate an intercode interference which follows such a fluctuation, there is used an automatic equalizer to automatically realize equalization characteristics by using a training signal which is sent prior to the data transmission.

In case of the magnetic disk apparatus, however, transmission path characteristics which are obtained by a path comprising a disk medium, a head, a head IC, and a read amplifier are fairly stable as compared with those of a communication system. Particularly, there is no need to consider a time-dependent fluctuation of the transmission path characteristics in a short time such as a frequency selective fading. There is a temperature change of the apparatus as a factor of the time-dependent fluctuation of the transmission path characteristics. Although such a temperature change causes a physical fluctuation of a head positioning control or the like, the transmission path characteristics are not so largely influenced.

Therefore, in the automatic equalization such that an error between an equalization output during the reproduction and an equalization target pattern is obtained and tap coefficients of a transversal filter are feedback controlled so as to minimize such an error, since there is no special fluctuation factor in the transmission path comprising the disk medium, head, head IC, and read amplifier, so long as the initial set tap coefficients are proper, no error eventually occurs. A necessity of the automatic equalization is low. There is, consequently, a problem such that in case of the magnetic disk apparatus, the use of the automatic equalizer causes a complication of a circuit construction and a complication of the control due to the automatic equalization.

The automatic equalizer of the conventional apparatus always controls the tap coefficients so as to minimize the equalization error by using the equalization target pattern of the memory even during the reproduction. However, there is a problem such that when the tap coefficients are controlled during the reproduction, the control of the tap coefficients traces a large noise mixture when a shock or vibration is applied, abnormal tap coefficients are set, and the equalization cannot be performed.

SUMMARY OF THE INVENTION

According to the invention, a magnetic disk apparatus and a read waveform equalizing method in which an intercode interference of a disk read waveform is certainly eliminated and a waveform equalization that is optimum to a Viterbi detection is performed are provided.

First, an apparatus of the invention comprises: an analog/digital converter for sampling and quantizing a read signal read out from a disk medium at predetermined pulse intervals; a transversal filter for eliminating intercede interference components included in the quantized read signal of the analog/digital converter; and a Viterbi decoder for detecting bit data from an output signal of the transversal filter in accordance with a Viterbi algorithm.

Tap coefficients which are set to the transversal filter are stored in a memory prior to using the apparatus. Namely, by designating a head number and a track number before the start of the use of the apparatus, an isolated waveform writing section writes a predetermined isolated waveform into a preset region of each track of a disk medium. An isolated waveform reading section subsequently reads out the isolated waveform written every track of the disk medium.

The read-out waveform from the disk medium is quantized by the analog/digital converter and the tap coefficients of the transversal filter are calculated by a tap coefficient calculating section on the basis of the quantized read waveform. The tap coefficients calculated by the tap coefficient calculating section are stored in the memory by an address designation based on the track number and head number which were used when writing the isolated waveform.

When reading out the disk medium during the use of the apparatus, a tap coefficient setting section reads out the corresponding tap coefficients by an address designation in the memory based on the track number and head number which were designated by the seek command and sets the read-out tap coefficients to the transversal filter.

The tap coefficient calculating section calculates the tap coefficients of the transversal filter in accordance with a zero focusing algorithm (ZF method) so as to minimize the absolute value sum of the intercode interference components included in the quantized isolated read signal.

The tap coefficient calculating section can also calculate the tap coefficients of the transversal filter in accordance with a minimum square error algorithm (MSE method) in which the square sum of the intercede interference components- included in the quantized isolated read signal is minimized. In this case, it is desirable to use the zero focusing algorithm because the processes are simple.

The inventors of the present invention obtained the optimum tap coefficients from the read isolated waveform while changing the number of taps of the transversal filter and set and evaluated its S/N ratio. Thus, in the case where the Viterbi decoder executes the maximum likelihood detection of the partial response class-4, namely, PR4 maximum likelihood detection (the binary class-4 partial response maximum likelihood), it has been found out that the optimum number of taps of the transversal filter is equal to eight. In the case where the Viterbi detector executes the maximum likelihood detection of the expanded partial response class-4, namely, the EPR4 maximum likelihood detection (the expanded binary class-4 partial response maximum likelihood), it has been found out that the optimum number of taps of the transversal filter is equal to seven.

As mentioned above, since the performance of the transversal filter depends on not only the optimization of the tap coefficients but also the number of taps, according to the invention, the tap coefficients of the transversal filter are set so as to include the number of taps.

For this purpose, although the tap number calculating section calculates the tap coefficients of the transversal filter having the initial value of a predetermined number of taps, a tap coefficient evaluating section evaluates whether the calculation result is proper or improper. Namely, in a state in which the tap coefficients calculated by the tap coefficient calculating section have been set in the transversal filter, the tap coefficient evaluating section transmits the read signal of the isolated waveform through the transversal filter and evaluates whether the output signal is proper or improper.

When it is improper, the number of taps of the transversal filter which are used for arithmetic operation of the tap coefficient calculating section is increased, thereby calculating the tap coefficients. Therefore, the tap coefficients of the number corresponding to the number of taps evaluated to be proper by the tap coefficient evaluating section are stored in the memory by an address designation based on the track number and head number which were used when writing the isolated waveform.

Therefore, as a transversal filter, a filter in which the number of taps can be selected within a range of predetermined minimum and maximum numbers is used. Specifically speaking, the transversal filter has a predetermined number of taps which give the maximum number of taps, a tap coefficient of zero is set for the taps which are not used, and an arbitrary number of taps are selected.

In the case where the Viterbi decoder executes the binary class-4 partial response maximum likelihood detection, the initial number of taps of the transversal filter is set to eight. In the case where the Viterbi decoder executes the expanded binary class-4 partial response maximum likelihood detection, the initial number of taps of the transversal filter is set to seven. In addition to the timing before the apparatus is used, the processes for calculating the tap coefficients from the read waveform and for storing them can be also executed when a power source of the apparatus is turned on, after the elapse of a predetermined use time, and when a read error occurs.

According to the invention, a method of equalizing a read waveform of a magnetic disk apparatus is provided. The equalizing method comprises the following steps.

I. Isolated waveform writing step of writing a predetermined isolated waveform into a predetermined region of each track of a disk medium prior to starting the use of the apparatus.

II. Isolated waveform reading step of reading the isolated waveform written every track of the disk medium in the isolated waveform writing step.

III. Calculating step of calculating tap coefficients of a transversal filter on the basis of a quantized read signal obtained by sampling the read signal read out in the isolated waveform reading step at predetermined pulse intervals and quantizing.

IV. Tap coefficient storing step of storing the tap coefficients calculated in the tap coefficient calculating step into a memory by an address designation based on a track number and a head number in the writing of the isolated waveform.

V. Tap coefficient setting step of reading out the corresponding tap coefficients and setting into the transversal filter by an address designation of the memory based on a track number and a head number by a seek command when the disk medium during the use of the apparatus is read out.

In the tap coefficient calculating step, the tap coefficients of the transversal filter are calculated in accordance with a zero focusing algorithm in which the absolute value sum of intercode interference components included in the quantized isolated read signal is minimized or a minimum square error algorithm in which the square sum of the intercode interference components included in the quantized isolated read signal is minimized.

Further, in the equalizing method whereby the number of taps of the transversal filter is varied, a tap coefficient evaluating step to vary the number of taps is provided. In the tap coefficient evaluating step, in a state in which the tap coefficients calculated in the tap coefficient calculating step are set to the transversal filter, whether an output signal obtained by inputting the read signal of the isolated waveform to the transversal filter is proper or improper is evaluated. When the output signal is improper, the tap coefficients are calculated in the tap coefficient calculating step in a state in which the number of taps of the transversal filter is increased. The tap coefficients which were evaluated to be proper in the tap coefficient evaluating step are stored in the memory by the address designation based on the track number and head number used when writing the isolated waveform.

According to such a disk apparatus of the invention, when the tap coefficients read out from the memory on the basis of the head number and track number are once set at the time of the reception of the seek command, the transversal filter operates as a fixed equalizer during the reproduction of the track. Therefore, the equalizer can be constructed by only the transversal filter in which the tap coefficients can be set from the outside and a circuit construction is simple and a control can be also easily performed as compared with the automatic equalization type in which the tap coefficients are controlled by the equalization error. Even if noises are mixed during the reproduction, since the tap coefficients are fixed, a situation such that the equalization cannot be performed by noises as in the automatic equalizer doesn't occur.

The characteristics of the transmission path comprising the disk medium, head, head IC, and read amplifier of the magnetic disk apparatus are relatively stable. By individually providing the optimum tap coefficients every track of the disk medium (corresponding to the head number), the setting of the optimum equalization characteristics according to a change in transmission path characteristics which are presumed by the magnetic disk apparatus can be realized.

Further, the optimum tap coefficients in which the intercede interference components are minimized are strictly calculated in accordance with the ZF method or MSE method as for the actual read waveform as a target, even if such tap coefficients are operated as a fixed equalizer set upon reproduction, since the transmission path characteristics are peculiar fixed characteristics every track, the optimum equalization waveform in which the intercede interference of the read waveform was eliminated can be obtained and the Viterbi decoder at the next stage can be accurately operated.

Further, with respect to a track of bad transmission path characteristics, since the optimum tap coefficients are obtained in a state in which the number of taps of the transversal filter was increased, the intercode interference components can be eliminated at a higher precision.

The above and other objects, features, and advantages of the present invention will become more apparent from the following detailed description with reference to the drawings.

BRIEF DESCRIPTION OF THE DRAWINGS

FIG. 5 is an explanatory diagram of a tap coefficients memory table of a non-volatile memory in FIG. 1;

FIG. 7 is an explanatory diagram of a track format for recording an isolated waveform;

FIGS. 8A and 8B are explanatory diagrams of the isolated waveform recording of a disk and a read signal;

DETAILED DESCRIPTION OF THE PREFERRED EMBODIMENTS

Figure 1:
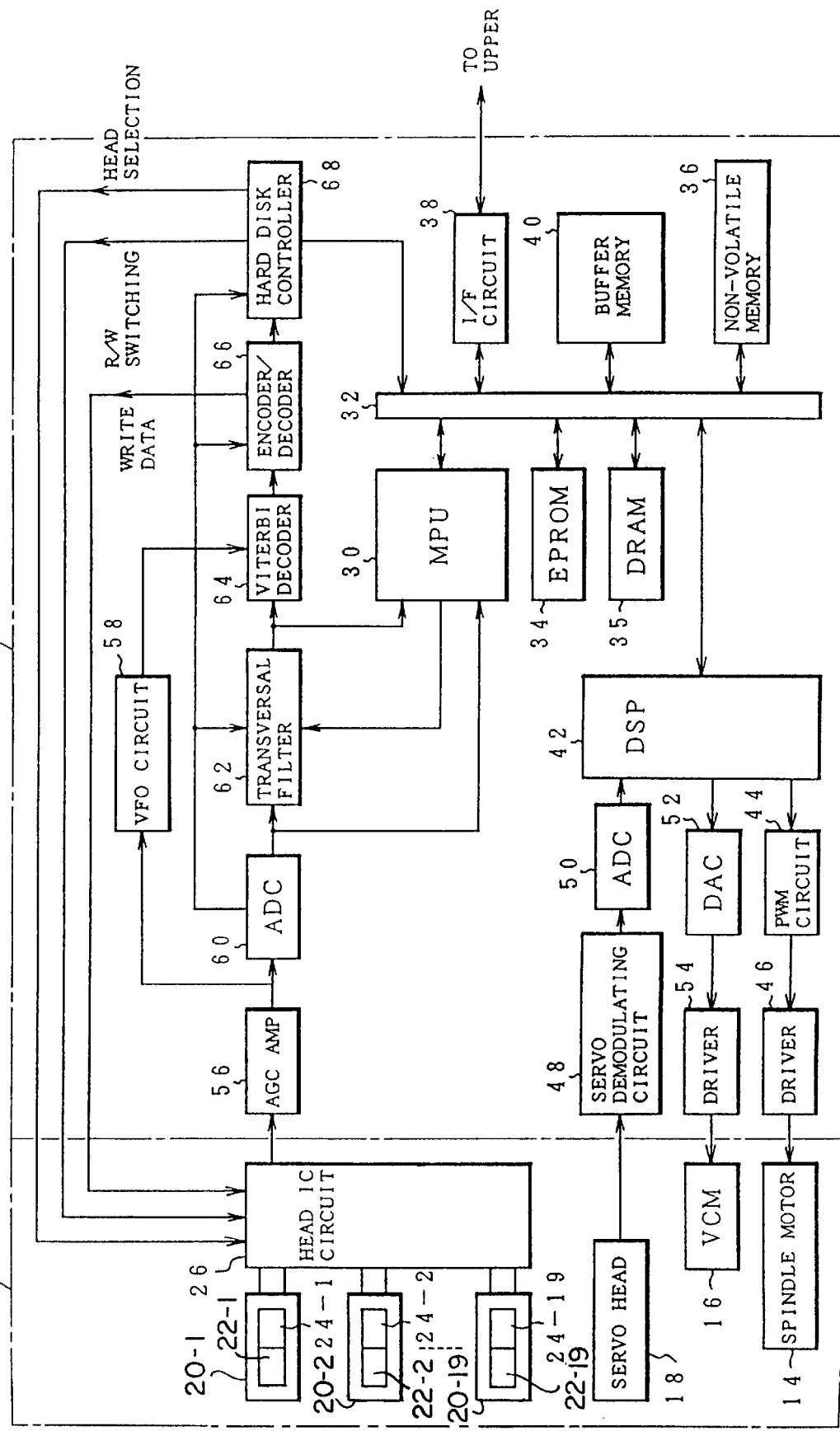
FIG. 1 is a block diagram showing an embodiment of the invention.

In FIG. 1, a magnetic disk apparatus of the invention is constructed by a disk enclosure 10 and a drive controller 12. A spindle motor 14 to rotate a disk and a voice coil motor (hereinafter, referred to as a VCM) 16 for positioning and moving a head are provided for the disk enclosure 10. A servo head 18 is provided to read out information on a servo surface of a magnetic disk. Further, to read and write information from/to data surfaces of a plurality of magnetic disks, compound heads 20-1 to 20-19 and a head IC circuit 26 are provided. The data heads 20-1 to 20-19 integratedly have write heads 22-1 to 22-19 and read heads 24-1 to 24-19, respectively. As write heads 22-1 to 22-19, magnetic heads are used. As read heads 24-1 to 24-19, MR heads using magneto-resistive elements are used.

Figure 2:
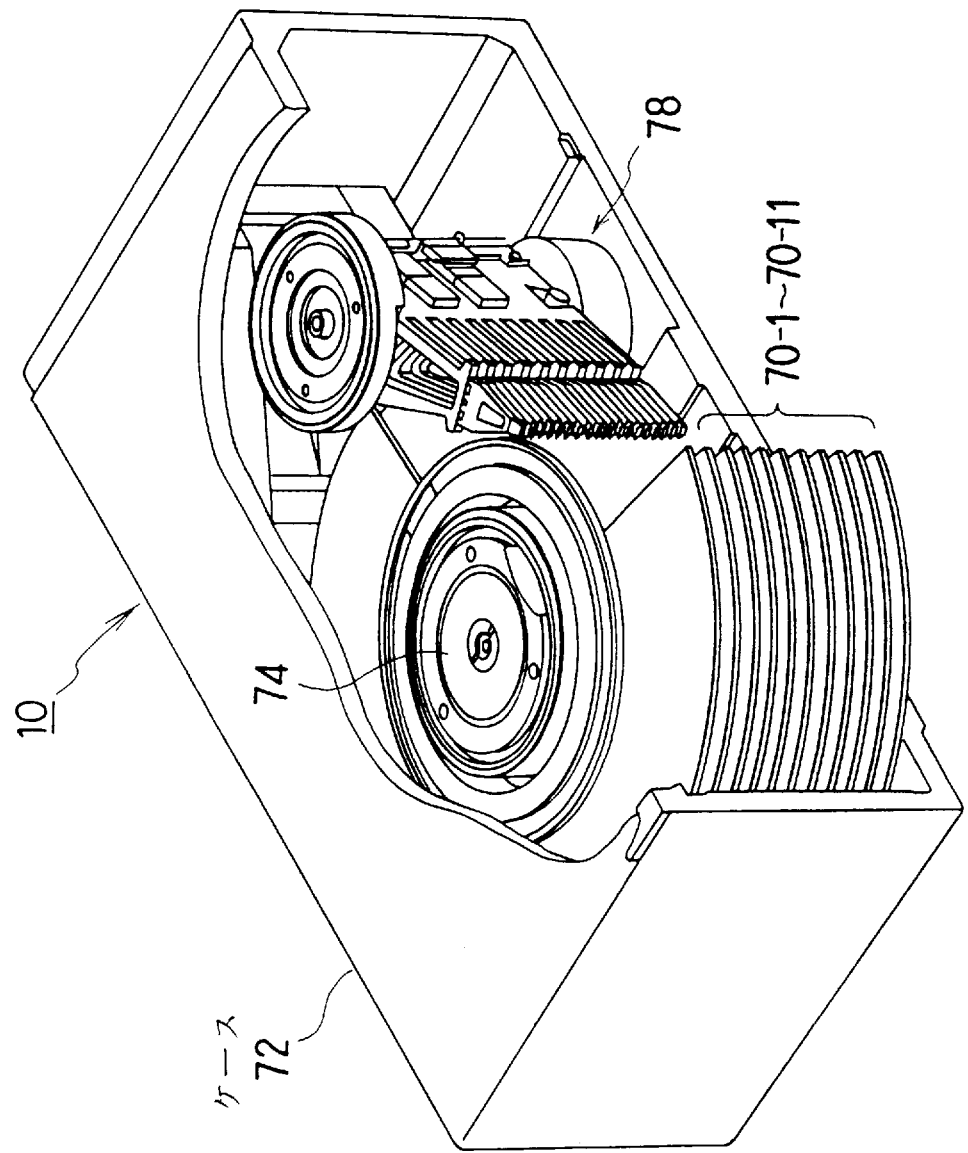
FIG. 2 is an explanatory diagram of a structure of a disk enclosure in FIG. 1.

FIG. 2 shows an internal structure of the disk enclosure 10 in FIG. 1. Eleven magnetic disks 70-1 to 70-11 are built in a casing 72 of the disk enclosure 10 by being supported by a rotary shaft 74 and are rotated by a spindle motor (not shown) provided in the lower portion. A head actuator 78 is provided on the right side of the magnetic disks 70-1 to 70-11. The head actuator 78 integratedly moves the head supported at an edge in the radial direction of each medium surface of the magnetic disks 70-1 to 70-11. In the embodiment, the disks each having a diameter of 5.25 inches are used as magnetic disks 70-1 to 70-11. The number of tracks per data surface is equal to about 2000 tracks.

Figure 3:
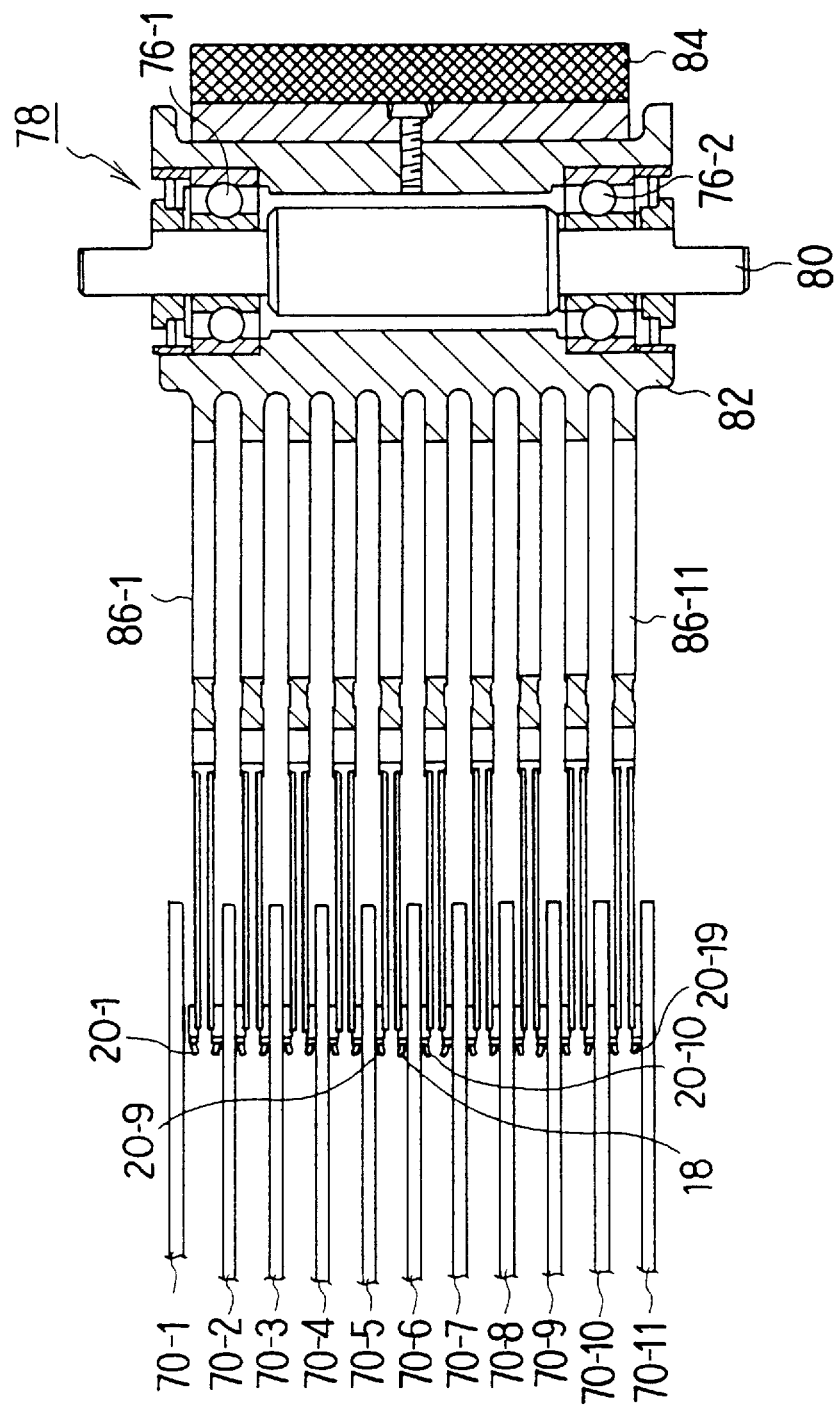
FIG. 3 is a side sectional view of a head actuator in FIG. 2.

FIG. 3 is a cross sectional view of the head actuator 78 in FIG. 2. In the head actuator 78, a block 82 is rotatably attached to a shaft 80 through upper and lower bearings 76-1 and 76-2. The shaft 80 is fixedly attached. A coil 84 of the VCM 16 is attached on the right side of the block 82. Eleven arms 86-1 to 86-11 are integratedly extended on the left side of the block 82. Two heads are supported at an edge of each of the arms 86-1 to 86-11 through a pair of spring arms. In the embodiment, 20 heads are provided for the eleven magnetic disks 70-1 to 70-11. Among them, upper nine heads are the data heads 20-1 to 20-9 and the servo head 18 is subsequently provided. Lower ten heads subsequent to the servo head 18 are the data heads 20-10 to 20-19. The disk surfaces of the magnetic disks 70-1 to 70-11 which the data heads 20-1 to 20-19 face are the data surfaces which are used for reading and writing data. On the other hand, the upper disk surface of the magnetic disk 70-6 at which the servo head 18 is located is the servo surface on which servo information has been recorded to all tracks. For example, a 2-phase phase servo pattern or a phase servo pattern has been recorded on the servo surface. The reason why the servo surface which faces the servo head 18 is set to the central magnetic disk 70-6 is to minimize the distances from the central servo surface to the farthest upper and lower magnetic disks 70-1 and 70-11, thereby minimizing an offset by a positional fluctuation of each data surface for the servo surface due to a mechanical deformation by a temperature change.

The drive controller 12 will now be described with reference to FIG. 1. A microprocessor unit (hereinafter, simply referred to as an MPU) 30 which functions as a control unit is provided for the drive controller 12. A read only EPROM 34 which is used as a program memory, a readable and writable DRAM 35, and a non-volatile memory 36 using an EPROM or the like are connected to a bus 32 of the MPU 30. Tap coefficients which are set to a transversal filter 62 are stored in the non-volatile memory 36. Correction data which is used for a thermal offset of a disk medium and the like are also stored in the non-volatile memory 36. An interface circuit (I/F circuit) 38 and a buffer memory 40 for data transfer are further connected to the bus 32 of the MPU 30. For example, an SCSI is used as an interface circuit 38. The I/F circuit 38 transmits and receives commands and data to/from an upper disk controller. Further, a cache memory can be also provided as necessary. A positioning control of the heads by the VCM 16 of the disk enclosure 10 is executed by a DSP (digital signal processor) 42.

The servo information read by the servo head 18 provided in the disk enclosure 10 is demodulated as a head position signal by a servo demodulating circuit 48 and is supplied to the DSP 42 through an A/D converter 50. When the MPU 30 receives a seek command from the upper controller through the I/F circuit 38, the MPU 30 notifies a cylinder address to the DSP 42 and instructs a seek control.

The DSP 42 to which the seek control was instructed drives the VCM 16 through a D/A converter 52 and a driver 54 and moves the heads 20-1 to 20-19 to the designated cylinder positions by a head actuator. The seek control is executed by a speed control comprising an acceleration control, a constant speed control, and a deceleration control. When the heads reach a target cylinder position, the control is switched to a position servo and a cylinder pull-in is executed. After completion of the cylinder pull-in, the control is switched to an ON-track control for allowing the head to trace a target cylinder. The spindle motor 14 provided for the disk enclosure 10 is rotated at a constant speed by a PWM (pulse width modulation) circuit 44 and a driver 46 in accordance with an instruction from the DSP 42.

As a read/write system of the drive controller 12, an AGC amplifier 56, a VFO circuit 58, an A/D converter 60, the transversal filter 62, a Viterbi decoder 64, an encoder/decoder 66, and a hard disk controller 68 are provided for the head IC circuit 26 of the disk enclosure 10. In a reading operation, the head IC circuit 26 is switched to, for example, the read head 24-1 of the compound head 20-1 by a switching signal from the hard disk controller 68. An analog read signal (read signal) from the read head 24-1 is supplied to the AGC amplifier 56. After the analog read signal was amplified by the AGC amplifier 56, it is inputted to the VFO circuit 58 and is also sampled and quantized at every predetermined pulse periods by the A/D converter 60. The VFO circuit 58 reproduces a clock synchronized with the analog read signal. To reproduce the clock from the analog read signal, a filter, an AGC amplifier, an equalizer, and a pulse shaper are provided for the VFO circuit 58. In a writing operation in which no analog read signal is obtained, a clock from a built-in VFO oscillator is used as a write clock. The clock formed by the VFO circuit 58 is supplied to the A/D converter 60, transversal filter 62, Viterbi decoder 64, encoder/decoder 66, and hard disk controller 68, thereby synchronizing the reading operation. A pulse interval (T) of sync pulses which are synchronized with the analog read signal from the VFO circuit 58 has a value which coincides with a predetermined write pulse interval.

The A/D converter 60 samples the analog read signal (read waveform) outputted from the AGC amplifier 56 at a clock period from the VFO circuit 58, thereby quantizing to digital data of a predetermined bit length. The transversal filter 62 eliminates intercode interference components included in the read waveform from the disk medium.

Figure 4:
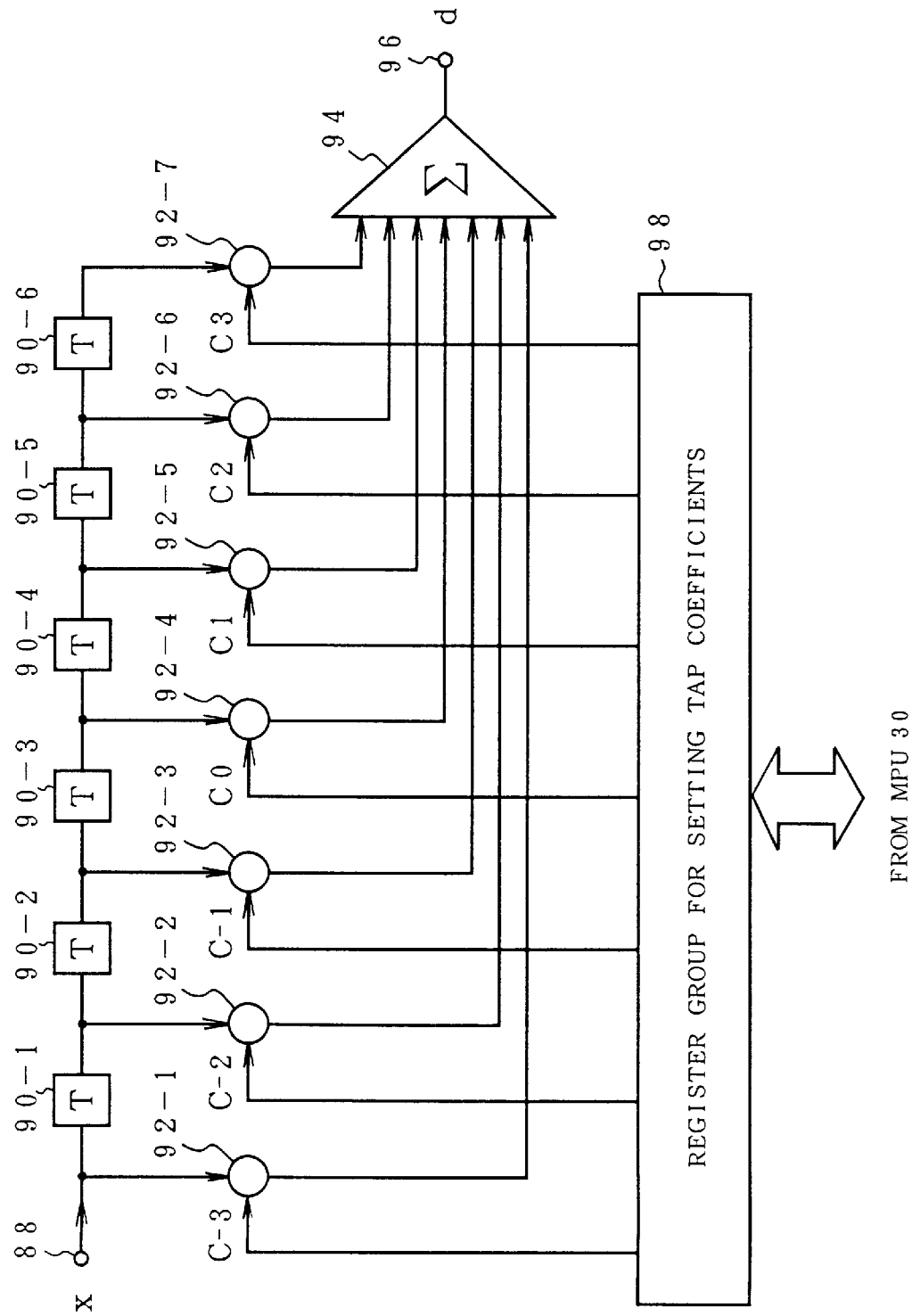
FIG. 4 is a circuit diagram of a transversal filter in FIG. 1.

FIG. 4 is a block diagram of the transversal filter 62 in FIG. 1. In the transversal filter, subsequent to an input terminal 88, delay circuits 90-1 to 90-6 each having a delay time of the pulse interval (T) are serially connected and multipliers 92-1 to 92-7 are provided to branch lines from an input stage to each delay stage and from an output stage. The multipliers 92-1 to 92-7 multiply tap coefficients c–3, c–2, c–1, c0, c1, c2, c3 which are set as equalization constants and delay outputs, respectively. Outputs of the multipliers 92-1 to 92-7 are added by an adder 94 and an equalization signal is outputted to an output terminal 96. Each of the tap coefficients c–3 to c3 for the multipliers 92-1 to 92-7 is externally set from the MPU 30 through a group of registers 98 for setting the tap coefficients.

Referring again to FIG. 1, the Viterbi decoder 64 is provided subsequent to the transversal filter 62. The Viterbi decoder 64 fetches the digital read signal equalized by the transversal filter 62 synchronously with the clock from the VFO circuit 58 and reconstructs a bit value which is thought to be most correct from the input series which includes the input at the present time point and which went back to the past by only a predetermined number of bits in accordance with a Viterbi algorithm known as a maximum likelihood detecting method. As a Viterbi algorithm, there are a maximum likelihood detection of the binary class-4 partial response (PR4) and a maximum likelihood detection of the expanded binary class-4 partial response (EPR4).

The reconstructed bit value is outputted to the encoder/decoder 66. The encoder/decoder 66 reconstructs the bit data outputted from the Viterbi decoder 64 synchronously with the clock and executes a formatting process by the hard disk controller 68 and, after that, stores the processed data into the buffer memory 40. After that, the stored data is transferred as read data to an upper apparatus through the interface circuit 38.

In the writing operation, the write data transferred to the buffer memory 40 through the interface circuit 38 is supplied through the hard disk controller 68 to the encoder/decoder 66 which has been switched to the encoder side at the time of the writing operation. The encoder/decoder 66 converts the write data to a 2–7 length code or the like and performs an addition of an ECC check code or the like. After that, the resultant data is supplied via the head IC circuit 26 to, for example, the write head 22-1 of the compound head 20-1 in the switching state at that time. The tap coefficients of the transversal filter 62 provided for the drive controller 12 of the invention have previously been stored in the non-volatile memory 36 every track of the magnetic disk.

FIG. 5 shows table information of the tap coefficients stored in the non-volatile memory 36. Namely, as table information of the tap coefficients, values which have previously been obtained are stored in seven regions of the tap coefficients c–3 to c3 of the transversal filter in FIG. 4 by using 2-dimensional addresses which are determined by a head address and a track address. Prior to starting the use of the disk apparatus of the present invention, a calculating process of the tap coefficients to be stored in the tap coefficient table in the non-volatile memory 36 is executed by a function of the MPU 30 in FIG. 6 at the time of, for example, a shipping.

Figure 6:
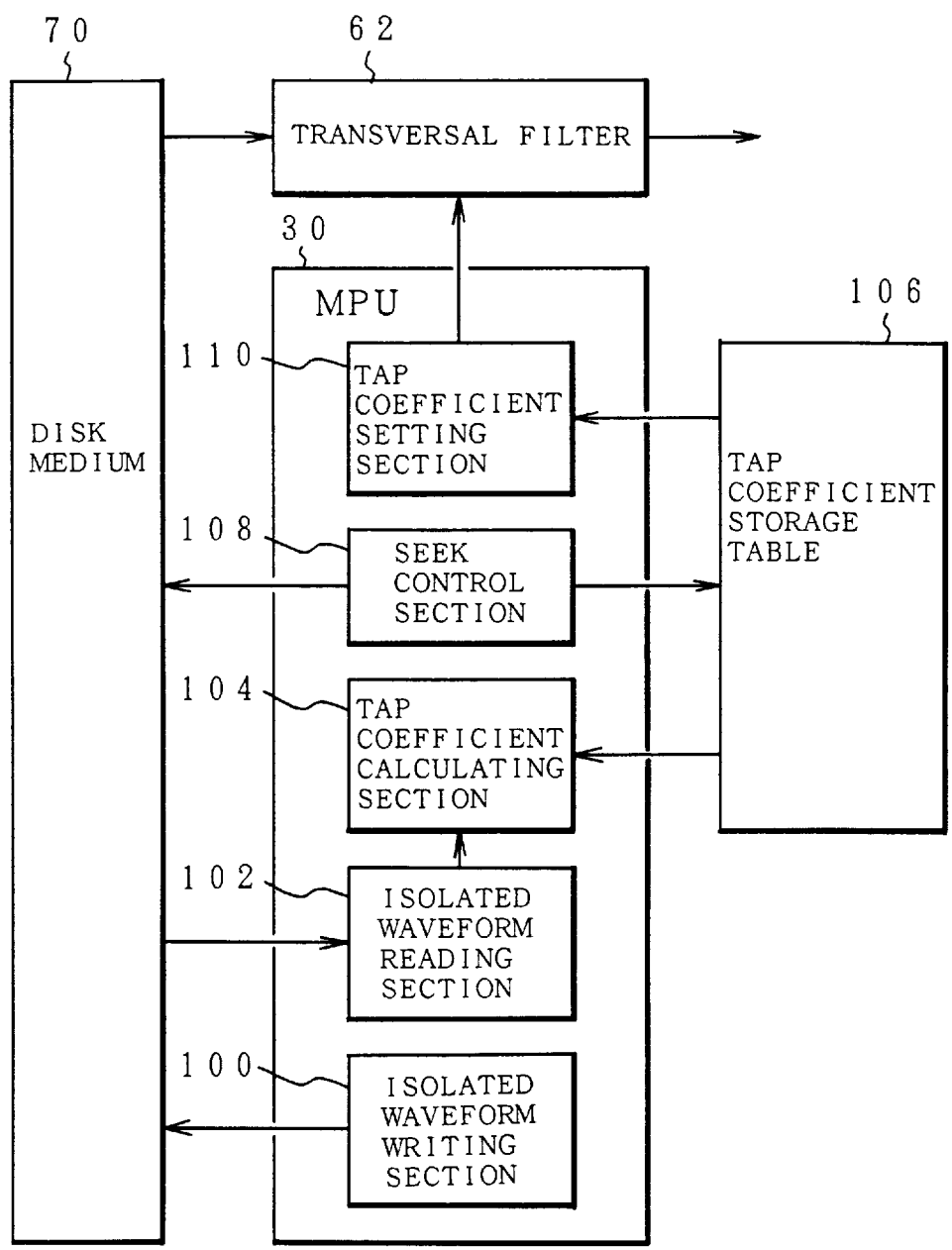
FIG. 6 is a functional block diagram for calculation setting of tap coefficients by an MPU in FIG. 1.

In FIG. 6, an isolated waveform writing section 100, an isolated waveform reading section 102, a tap coefficient calculating section 104, a seek control section 108, and a tap coefficient setting section 110 are provided for the MPU 30. The isolated waveform writing section 100 writes an isolated waveform every track of a disk medium 70 while sequentially designating a head address and a cylinder address by the seek control section 108 when the tap coefficients are calculated and stored.

FIG. 7 shows a track format of the disk medium of the invention. An index 112 is provided at the head of the track format. Subsequent to the index 112, an isolated waveform writing section 114 is provided. After the isolated waveform writing section 114, a valid recording section 116 is provided. As shown in FIG. 8A, when an isolated waveform is written, magnetic pole changes from S to N and from N to S are written in a recording track 118. The isolated waveform reading section 102 in FIG. 6 reads out the isolated waveform from the track of the disk medium 70 written by the isolated waveform writing section 100. A read signal of the isolated waveform has a read waveform 120 in FIG. 8B.

The tap coefficient calculating section 104 calculates the tap coefficients c–to c3 to eliminate the intercode interference components included in the read signal by the transversal filter 62 with respect to the isolated waveform read out by the isolated waveform reading section 102 as a target. A calculating principle of the tap coefficients of the transversal filter 62 will now be described.

The transversal filter 62 synthesizes signals taken out by multiplying tap coefficients $c_j$ (j=–N, . . ., –1, 0, 1, . . ., N) as weight coefficients to the tap outputs of the delay circuits having taps every pulse transmission time interval (T), thereby obtaining an output signal.

Now, assuming that an input of a single path response for the transversal filter, namely, an input of the isolated waveform is set to x(t), an output h(t) of the transversal filter is expressed by the following equation by using the weight coefficients $[c_j]$.

$$h(t) = \sum_{j=-N}^{N} c_j x(t - jT) \quad (1)$$

Now, by expressing an output value at time (nT) by $h_n$ =h(nT), the following equation is obtained from the equation (1).

$$h_n = \sum_{j=-N}^{N} c_j x_{n-j} \quad (2)$$

In the equation (2), n=0 denotes a main pulse and the other responses result in intercode interference components.

As a reference to evaluate the intercede interference components, a method whereby an absolute value sum $$D_{ZF} = \frac{1}{h_0} \sum_{n=-\infty}^{\infty} |h_n| \quad (3)$$

of the intercode interference amounts is obtained in the relation with a main pulse and is minimized is used. Such a method is called a zero focusing algorithm (ZF method).

Similarly, a method whereby the square sum $$D_{MSE} = \frac{1}{h_0^2} \sum_{n=-\infty}^{\infty} h_n^2 \quad (4)$$

of the intercode interference amounts is obtained in the relation with the main pulse and is minimized is also used. Such a method is called a minimum square error algorithm (MSE method).

It is known that an absolute value sum DDF in the zero focusing algorithm is minimum when $h_n=0$ (n<N, n≠0). Thus, the optimum tap coefficients can be obtained by solving simultaneous equations at next (2N +1) at which $c_j$ (j=−N, . . ., N) are returned.

$$xc = d \quad (5)$$
$$c = (C_{-N}, \ldots C_0, \ldots C_N)$$
$$x = \begin{pmatrix} x_0, x_{-1}, \ldots, x_{-2N} \\ x_1, x_0, \ldots, x_{-2N+1} \\ \vdots \\ x_{2N}, x_{2N-1}, \ldots, x_0 \end{pmatrix}$$
$$d = (0, \ldots, 0, 1, 0, \ldots, 0)^t$$

The above simultaneous equations are shown as follows with respect to the transversal filter of seven taps in FIG. 4.

$$c = (c_{-5}, c_{-4}, c_{-3}, c_{-2}, c_{-1}, c_0, c_1, c_2, c_3, c_4, c_5) \quad (7)$$

$x =$ $$\begin{pmatrix}
x_0, & x_{-1}, & x_{-2}, & x_{-3}, & x_{-4}, & x_{-5}, & x_{-6}, & x_{-7}, & x_{-8}, & x_{-9}, & x_{-10} \\
x_1, & x_0, & x_{-1}, & x_{-2}, & x_{-3}, & x_{-4}, & x_{-5}, & x_{-6}, & x_{-7}, & x_{-8}, & x_{-9} \\
x_2, & x_1, & x_0, & x_{-1}, & x_{-2}, & x_{-3}, & x_{-4}, & x_{-5}, & x_{-6}, & x_{-7}, & x_{-8} \\
x_3, & x_2, & x_1, & x_0, & x_{-1}, & x_{-2}, & x_{-3}, & x_{-4}, & x_{-5}, & x_{-6}, & x_{-7} \\
x_4, & x_3, & x_2, & x_1, & x_0, & x_{-1}, & x_{-2}, & x_{-3}, & x_{-4}, & x_{-5}, & x_6 \\
x_5, & x_4, & x_3, & x_2, & x_1, & x_0, & x_{-1}, & x_{-2}, & x_{-3}, & x_{-4}, & x_{-5} \\
x_6, & x_5, & x_4, & x_3, & x_2, & x_1, & x_0, & x_{-1}, & x_{-2}, & x_{-3}, & x_{-4} \\
x_7, & x_6, & x_5, & x_4, & x_3, & x_2, & x_1, & x_0, & x_{-1}, & x_{-2}, & x_{-3} \\
x_8, & x_7, & x_6, & x_5, & x_4, & x_3, & x_2, & x_1, & x_0, & x_{-1}, & x_{-2} \\
x_9, & x_8, & x_7, & x_6, & x_5, & x_4, & x_3, & x_2, & x_1, & x_0, & x_{-1} \\
x_{10}, & x_9, & x_8, & x_7, & x_6, & x_5, & x_4, & x_3, & x_2, & x_1, & x_0
\end{pmatrix}$$

$d = (0, 0, 0, 0, 1, 1, 0, 0, 0, 0, 0)$

Figure 9A:
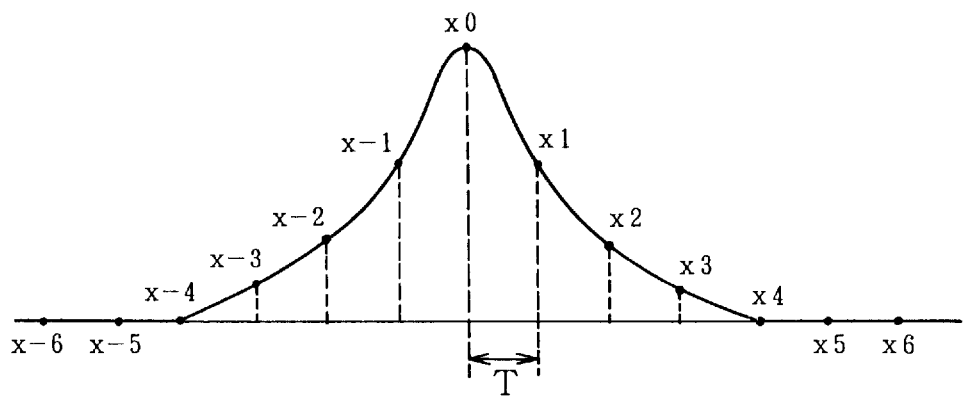
FIGS. 9A and 9B are explanatory diagrams of a read isolated waveform and an ideal equalization waveform.

The read waveform as an input of the transversal filter is an isolated waveform as shown in FIG. 9A and has sample values $x_{-6}$ to $x_{-1}$ and $x_1$ to $x_6$ arranged on the left and right time bases around a sample value $x_0$ of the main pulse corresponding to a tap center as a center. On the other hand, the calculation of the optimum solution of the tap coefficients by the minimum square error algorithm to minimize the square sum $D_{MSE}$ in the equation (4) is obtained by using what is called a variational method.

Figure 9B:
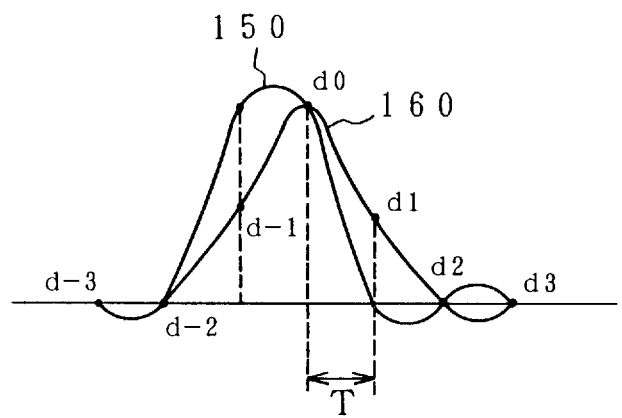

FIG. 9B shows an equalization output waveform 150 and an equalization output waveform 160. The waveform 150 is obtained when the optimum solution of the tap coefficients obtained by the zero focusing algorithm is set to the transversal filter and an isolated waveform in FIG. 9A is equalized. The waveform 160 is obtained when the optimum tap coefficients calculated by the minimum square error algo- rithm is set to the transversal filter and the isolated waveform of FIG. 9A is equalized. Those equalization output waveforms 150 and 160 are ideal equalization waveforms, respectively.

Equalization precision of the zero focusing method of obtaining the optimum solution of the tap coefficients and the minimum square error method are not so different. Since the algorithm of the zero focusing method is simpler, the tap coefficient calculating section 104 in FIG. 6 uses the zero focusing algorithm. When the MPU 30 has a high processing performance, the minimum square error algorithm can be also used.

Figure 10:
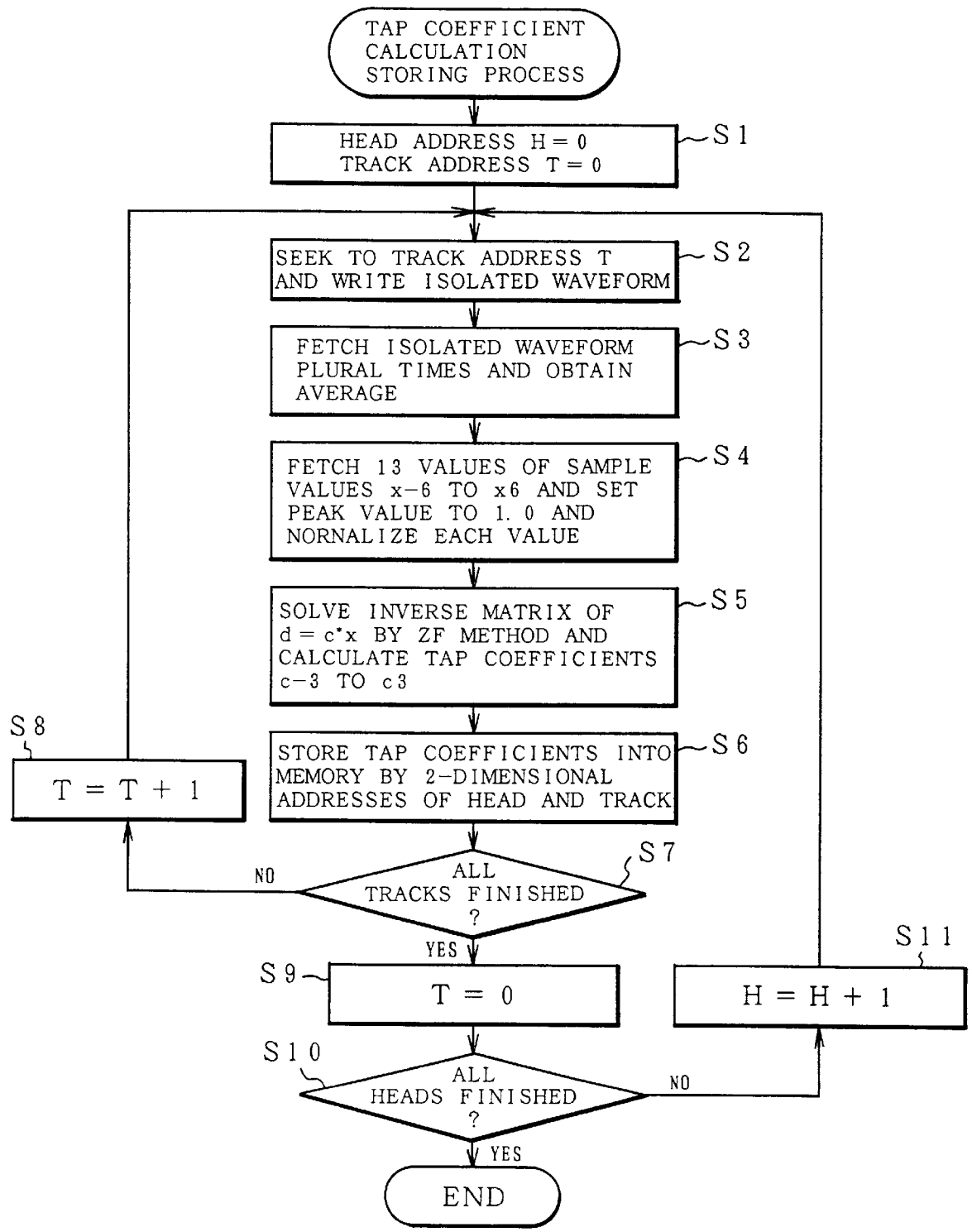
FIG. 10 is a flowchart for tap coefficient calculating and storing processes in the invention.

A flowchart of FIG. 10 relates to tap coefficient calculating and storing processes by each function of the MPU 30 in FIG. 6. First in step Si, each of a head address (H) and a track address (T) is initialized to address 0. When the head address H=0 is set, in the disk enclosure 10 in FIG. 1, the head IC circuit 26 selects the write head 22-1 of the head section 20-1. In step S2, the head is sought to the track address T=0 and the isolated waveform is written by the isolated waveform writing section 114 of the track format in FIG. 6. In step S3, the isolated waveform is fetched a plurality of number of times and are sampled and are averaged. As an averaged sample value, thirteen sample values $x_{-6}$ to $x_6$ having a distribution on the time base as shown in FIG. 9A are fetched and each value is normalized by setting the peak value of $x_0$ to 1.0.

In step S5, by substituting the sample values $x_{-6}$ to $x_6$ into the equation (6), an inverse matrix of d=c x×is solved by the zero focusing method (ZF method) and the tap coefficients $C_{-3}$ to $C_3$ are calculated. In step S6, the calculated tap coefficients are stored in a tap coefficient storage table 106 in the memory on the basis of the 2-dimensional address which is determined by the head address (H) and track address (T). In step S7, a check is made to see if the processes for all of the tracks have been finished or not. If NO, the track address is increased by one in step S8. The processes in steps S2 to S6 are repeated until the processes for all of the tracks are finished. When the processes for all tracks are finished, this means that the calculation and storage of all of the tap coefficients with respect to one data surface are finished. Therefore, in step S9, the track address (T) is again returned to T=0. In step S10, a check is made to see if the processes for all of the heads have been finished or not. If NO, in step S11, the head address (H) is increased by one and the processes in steps S2 to S6 are repeated with respect to a new data surface. By the above processes, the value of the optimum tap coefficient based on the read-out result of the isolated waveform written every track of all of the data surfaces of the magnetic disks is calculated and stored into the tap coefficient storage table 106.

Figure 11:
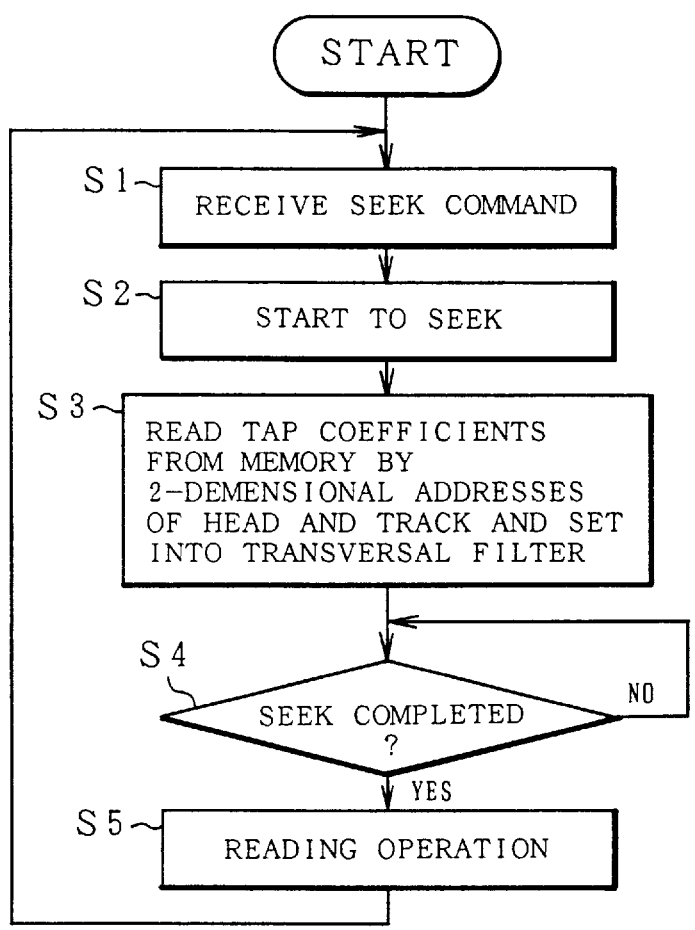
FIG. 11 is a time chart for the reading operation of the invention.

FIG. 11 shows the reading operation of the disk apparatus of the invention accompanied with the setting of the optimum tap coefficient for the transversal filter 62. First in step S1, when a seek command in association with the reading operation is received, a cylinder address and a track address are known as command parameters. In step S2, the seeking operation based on the cylinder address is started. During the seeking operation, as shown in step S3, the corresponding tap coefficient is read out from the tap coefficient storage table stored in the memory by using the 2-dimensional address based on the head address and track address designated by the seek command and is set in the transversal filter 62. In step S4, a check is made to see if the seeking operation has been completed or not. If YES, step S5 follows and the reading operation is executed. In this instance, since the tap coefficient that is optimum to eliminate the intercode interference components which are peculiar to the track and was obtained at the time of the initialization of the apparatus has been set in the transversal filter 62, even if the intercede interference components are included in each read waveform, it can be certainly eliminated. The read digital waveform having a sampling component of the main pulse is supplied to the Viterbi decoder 64. Correct bit data can be accurately reconstructed.

The number of taps of the transversal filter 62 which is used in the invention will now be described. As well known, as a Viterbi decoder which is combined with the transversal filter, there are a decoder to perform the PR4 maximum likelihood detection and a decoder to perform the EPR4 maximum likelihood detection. Therefore, the inventors et al. of the present invention have evaluated the relation between the number of taps of the transversal filter and the error rate.

Figure 12:
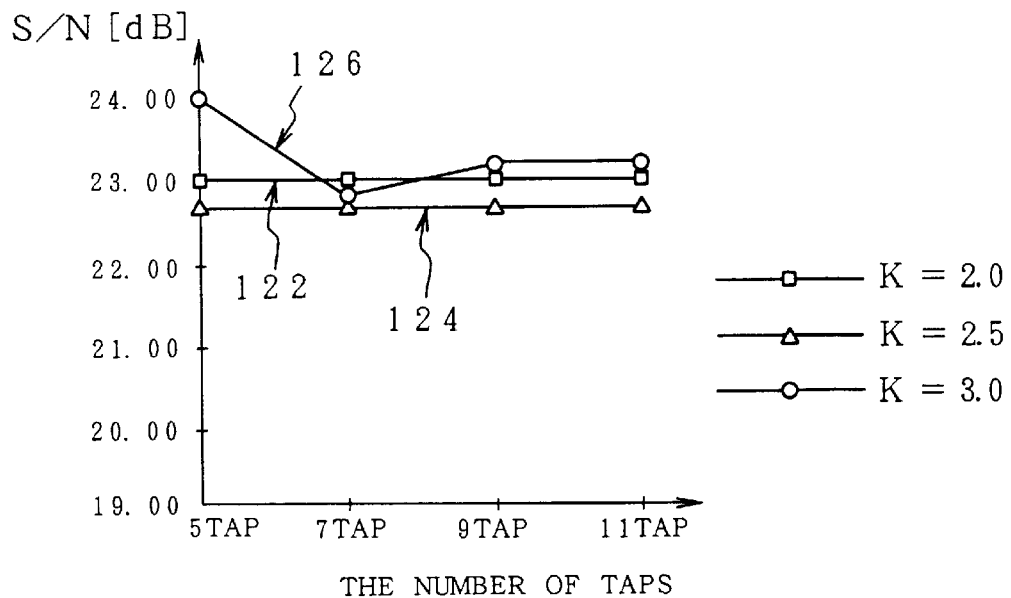
FIG. 12 is a graph showing characteristics between the number of taps of a transversal filter which is used in the PR4 maximum likelihood detection and the S/N ratio.
Figure 13:
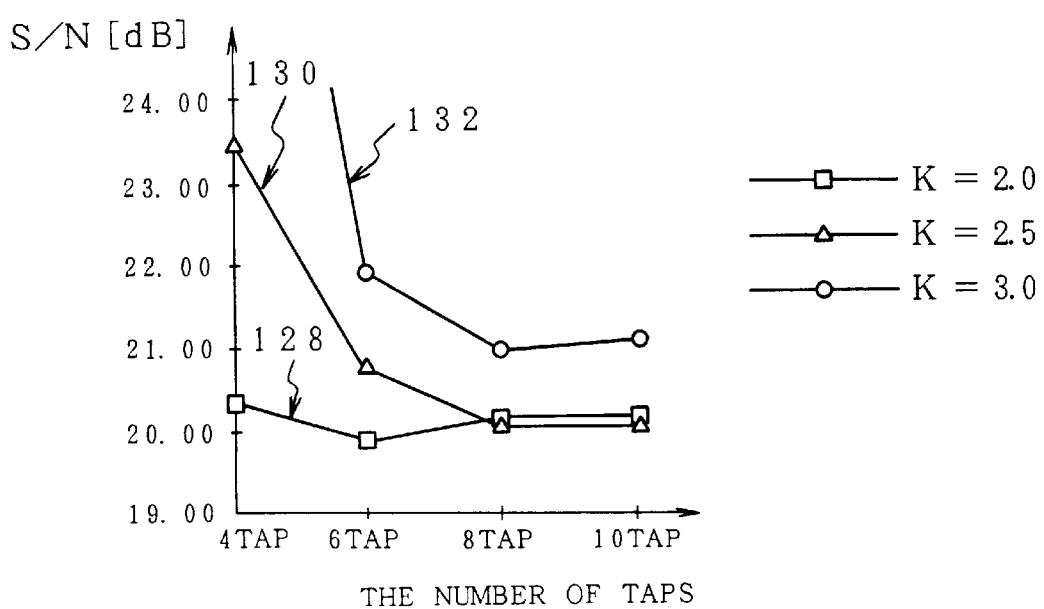
FIG. 13 is a graph showing characteristics between the number of taps of a transversal filter which is used in the EPR maximum likelihood detection and the S/N ratio.

FIG. 12 shows the evaluation result in the case where the number of taps of the transversal filter is set to 5, 7, 9, and 11 with respect to the Viterbi decoder to perform the EPR4 maximum likelihood detection and, with respect to each tap, the optimum tap coefficient is calculated in accordance with the flowchart of FIG. 10 and is set to the transversal filter every tap. FIG. 13 shows the evaluation result in the case where with respect to the Viterbi decoder to perform the PR4 maximum likelihood detection, the number of taps of the transversal filter is set to 4, 6, 8, and 10 and, with regard to each tap, the optimum tap coefficient is calculated in accordance with the flowchart of FIG. 10 and is set to the transversal filter every tap. The evaluation conditions are set as follows.

| | |
|---|---|
| •waveform: | Lorentz waveform |
| •Viterbi decoder: | PR4 maximum likelihood detection or EPR4 maximum likelihood detection |
| •S/N definition: | S/N ratio of isolated waveform after equalization |
| •Noises: | Addition after equalization to eliminate change in noises due to equalization |
| •Tap coefficients: | Calculation by zero focusing method |
| •The number of taps: | (PR4). . . 4, 6, 8, 10 taps |
| | (EPR4). . . 5, 7, 9, 11 taps |
| •Evaluation pattern: | Random pattern |
| •K(TW50/TW) | 2.0, 2.5, 3.0 |

In the transversal filter combined with the Viterbi decoder for the EPR4 maximum likelihood detection in FIG. 12, when characteristics 122 and 124 of K=2.0 and 2.5 are seen, even if the number of taps is changed, the S/N ratio is constant. With respect to characteristics 126 when K=3.0, although the S/N ratio is improved by an amount of about up to 1 dB due to a change in number of taps, there is hardly an influence. On the other hand, FIG. 13 relates to the transversal filter combined with the Viterbi decoder for the PR4 maximum likelihood detection. Even with respect to any of characteristics 128, 130, and 132 when K=2.0, 2.5, and 3.0, as the number of taps increases to 4, 6, and 8, the S/N ratio is improved. However, even if the number of taps is increased from 8 to 10, the S/N ratio is hardly improved.

The inventors of the present invention has judged at first that with regard to any one of the Viterbi decoders of PR4 and EPR4, as the number of taps of the transversal filters is large, a degree of improvement of the S/N ratio is large. From the evaluation results of FIGS. 12 and 13, however, there was obtained the result such that with respect to the transversal filter of the Viterbi decoder for the EPR4 maximum likelihood detection of FIG. 12, when exceeding a certain limit, the S/N ratio hardly depends on the number of taps.

Figure 14:
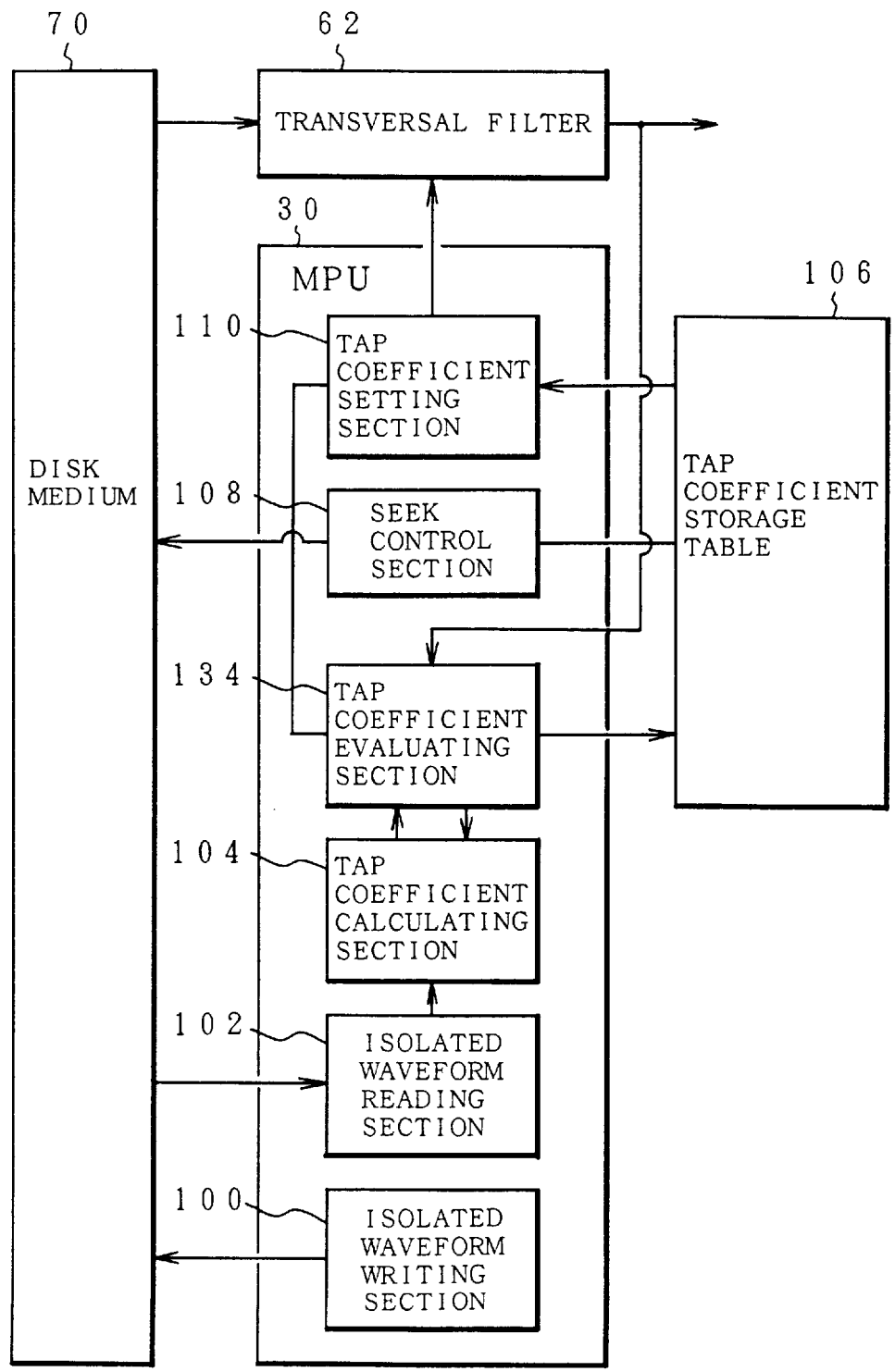
FIG. 14 is a functional block diagram of the calculation setting of tap coefficients of the invention to which a control of the number of taps is added.

FIG. 14 shows the second embodiment of the calculation and storage of tap coefficients which are executed by the MPU 30 in FIG. 1 before starting the use of the apparatus. The second embodiment is characterized in that the number of taps of the transversal filter is also changed.

In FIG. 14, a tap coefficient evaluating section 134 is newly provided for the MPU 30. The tap coefficient evaluating section 134 sets the tap coefficients calculated first by the tap coefficient calculating section 104 to the transversal filter 62, actually obtains an equalization output of a read waveform from the disk medium 70, compares the equalization waveform with a sample value of an ideal equalization waveform as shown in FIG. 9B, and obtains an error. When the error obtained as mentioned abovementioned above lies within a predetermined value, the calculated tap coefficient is decided to be proper and is stored into the tap coefficient storage table 106. However, when the calculated error exceeds the predetermined value, it is judged that the intercode interference components are not sufficiently eliminated in case of the present number of taps of the transversal filter 62. In a state in which the number of taps of the transversal filter 62 is increased, the tap coefficient calculating section 104 calculates the tap coefficients of the number corresponding to the increased number of taps. After the tap coefficients were calculated, in a manner similar to the above, the tap coefficients are set to the transversal filter 62, the read waveform from the disk medium 70 is equalized, and an error between the equalization waveform and the ideal equalization waveform is obtained. When the error lies within a predetermined value, the tap coefficients calculated with respect to the increased number of taps are stored in the tap coefficient storage table 106.

Figure 15:
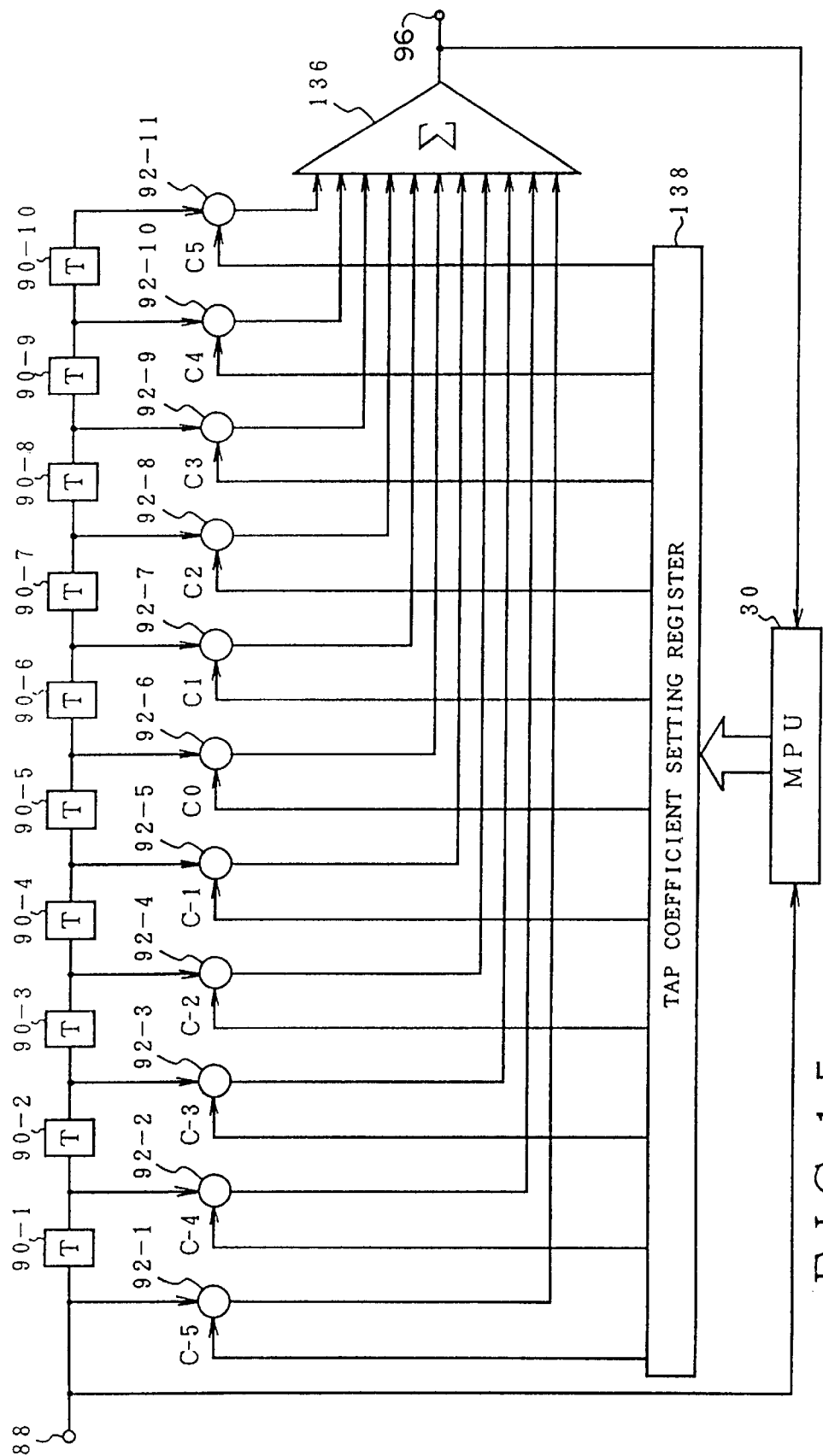
FIG. 15 is a circuit diagram of a transversal filter which is used in a variable control of the number of taps.

Since the number of taps of the transversal filter 62 is varied by the evaluation result of the tap coefficient evaluating section 134, the transversal filter in which the maximum number of taps is equal to 11 in FIG. 15 is used as a transversal filter 62.

The transversal filter of FIG. 15 comprises: ten delay circuits 90-1 to 90-10; eleven multipliers 92-1 to 92-11; an adder 136 to add outputs of the multipliers 92-1 to 92-11; and a tap coefficient setting register 138 to set tap coefficients to the eleven multipliers 92-1 to 92-11. When selecting the tap coefficients, it is sufficient to set the tap coefficients which are not used to zero. For example, when the tap coefficient 7 is selected, the tap coefficients $c_{-5}$, $C_{-4}$, $C_4$, and $c_5$ for the multipliers 92-1, 92-2, 92-10, and 92-11 are set to zero. In case of setting the number of taps to 8, the tap coefficients $C_{-5}$ and $C_5$ of the multipliers 92-1 and 92-11 are set to zero. The simultaneous equations to obtain the optimum solution of the tap coefficient by the tap coefficient calculating section 104 in FIG. 14 by, for example, the zero focusing type algorithm are as follows.

$$c = (c_{-5}, c_{-4}, c_{-3}, c_{-2}, c_{-1}, c_0, c_1, c_2, c_3, c_4, c_5) \quad (7)$$

$$x =$$

$$\begin{pmatrix} x_0, & x_{-1}, & x_{-2}, & x_{-3}, & x_{-4}, & x_{-5}, & x_{-6}, & x_{-7}, & x_{-8}, & x_{-9}, & x_{-10} \\ x_1, & x_0, & x_{-1}, & x_{-2}, & x_{-3}, & x_{-4}, & x_{-5}, & x_{-6}, & x_{-7}, & x_{-8}, & x_{-9} \\ x_2, & x_1, & x_0, & x_{-1}, & x_{-2}, & x_{-3}, & x_{-4}, & x_{-5}, & x_{-6}, & x_{-7}, & x_{-8} \\ x_3, & x_2, & x_1, & x_0, & x_{-1}, & x_{-2}, & x_{-3}, & x_{-4}, & x_{-5}, & x_{-6}, & x_{-7} \\ x_4, & x_3, & x_2, & x_1, & x_0, & x_{-1}, & x_{-2}, & x_{-3}, & x_{-4}, & x_{-5}, & x_6 \\ x_5, & x_4, & x_3, & x_2, & x_1, & x_0, & x_{-1}, & x_{-2}, & x_{-3}, & x_{-4}, & x_{-5} \\ x_6, & x_5, & x_4, & x_3, & x_2, & x_1, & x_0, & x_{-1}, & x_{-2}, & x_{-3}, & x_{-4} \\ x_7, & x_6, & x_5, & x_4, & x_3, & x_2, & x_1, & x_0, & x_{-1}, & x_{-2}, & x_{-3} \\ x_8, & x_7, & x_6, & x_5, & x_4, & x_3, & x_2, & x_1, & x_0, & x_{-1}, & x_{-2} \\ x_9, & x_8, & x_7, & x_6, & x_5, & x_4, & x_3, & x_2, & x_1, & x_0, & x_{-1} \\ x_{10}, & x_9, & x_8, & x_7, & x_6, & x_5, & x_4, & x_3, & x_2, & x_1, & x_0 \end{pmatrix}$$

$$d = (0, 0, 0, 0, 1, 1, 0, 0, 0, 0, 0)$$

In the equation (7), a region surrounded by an inside dotted line shows a matrix equation of seven taps, a region surrounded by a middle dotted line shows a matrix equation of nine taps, and a region surrounded by an outermost dotted line shows a matrix equation of eleven taps. Therefore, it is sufficient that the matrix equation of 11 taps is prepared, all of the coefficients of an unrelated region are set to zero in accordance with the number of taps, and a solution of an inverse matrix is obtained.

Figure 16:
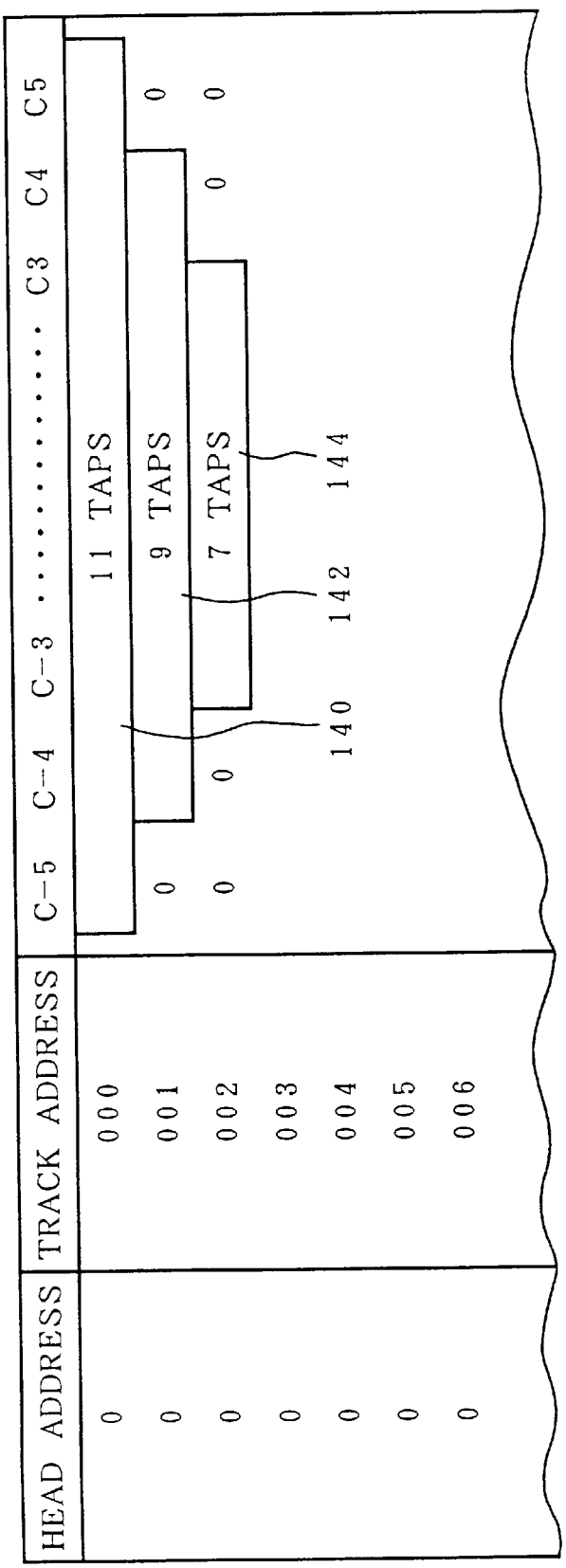
FIG. 16 is an explanatory diagram of the contents of a tap coefficients storing section accompanied with a variable control of the number of taps.

FIG. 16 shows memory contents of the tap coefficient storage table 106 stored on the basis of the evaluation by the tap coefficient evaluating section 134 in FIG. 14. For example, with respect to the head address 0 and track address 000, tap coefficient data 140 of 11 taps is stored. With respect to the next track address 001, tap coefficient data 142 of 9 taps is stored. Further, with regard to the track address 002, tap coefficient data 144 of 7 taps is stored. In a portion out of the data regions of each tap, the tap coefficient 0 is stored as invalid data.

Figure 17:
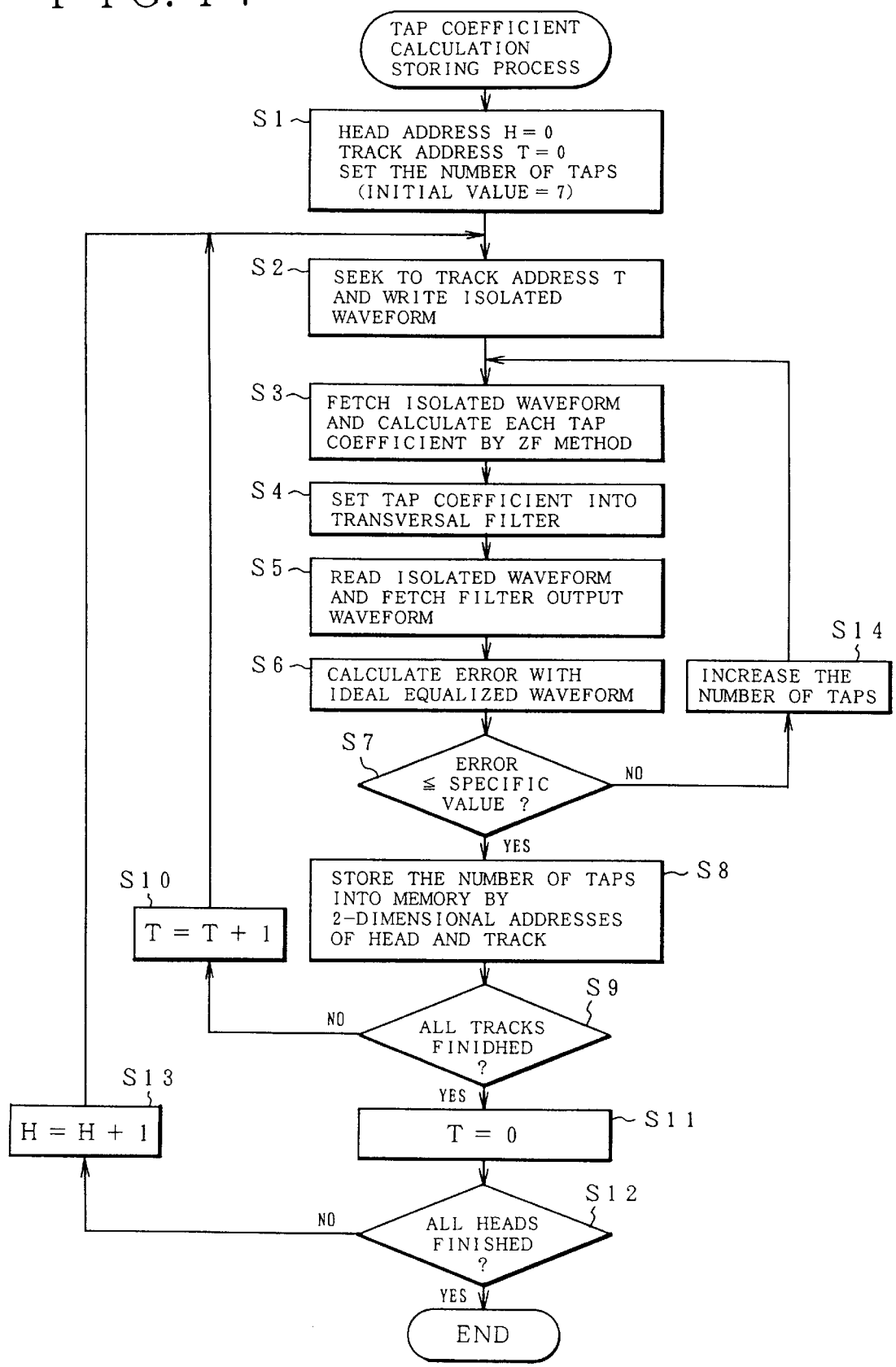
FIG. 17 is a flowchart for tap coefficients calculating and storing processes accompanied with a variable control of the number of taps.

A flowchart of FIG. 17 relates to calculating and storing processes of tap coefficients accompanied with a variation of the number of taps by the MPU 30 in FIG. 14. In step S1, simultaneously with that the head address (H) and track address (T) are set to address 0, the number of taps of the transversal filter is initialized. In case of combining the transversal filter with the Viterbi decoder for the EPR4 maximum likelihood detection, since it is sufficient to provide seven or more taps from the evaluation result of FIG. 12, the number of taps (7) is set as an initial value. In case of combining the transversal filter with the Viterbi decoder for the PR4 maximum likelihood detection, the number of taps (8) is set as an initial value from the characteristics of FIG. 13. It is also possible to set the number of taps of 7, 8, or less as an initial value as necessary. In step S2, the head is sought to the track address (T) and an isolated waveform is written. In step S3, the isolated waveform is read out and tap coefficients are calculated by the zero focusing method. In step S4, the calculated tap coefficients are set to the transversal filter. In step S5, the isolated waveform is read and an output waveform of the filter is fetched. In step S6, an error between the output waveform and the ideal equalization waveform is calculated. For example, the sum of errors of respective sample values is obtained. As another method, it is also possible to evaluate by obtaining a cross correlation or autocorrelation between the equalization waveform and ideal waveform.

When the error is obtained, a check is made in step S7 to see if the calculated error is equal to or less than a specific value or not. If YES, the calculated tap coefficients are stored in the memory by the 2-dimensional address of the head address and track address in step S8. When the error exceeds the specific value, the number of taps is increased in step S14. Since the transversal filter of the odd number of taps of the initial tap number 7 is used in the embodiment, the number of taps is increased to 9 in step S14. In steps S3 to S6, the tap coefficients are calculated and evaluated with respect to the increased number of taps. When the error is equal to or less than the specific value in step S7, the tap coefficients of the increased number of taps (9) are stored in the memory. When the error doesn't decrease to the specific value or less even if the number of taps is increased to 9, the number of taps is further increased to 11 in step S4 and processes similar to those mentioned above are executed.

In the ordinary state, by increasing the number of taps to the maximum value 11, the error lies within the specific value and, in step S8, the calculated coefficients of 11 taps are stored in the memory. On the other hand, in the case where the error doesn't decrease to the specific value or less even if the number of taps is set to 11, it is judged that there is a defect in the medium. Necessary processes are executed.

Further, the calculating and storing processes of the tap coefficients of the invention shown in the above embodiment are first executed prior to using the apparatus upon shipping from a factory. However, even in a use state of the apparatus after shipping, the calculating and storing processes of the tap coefficients can be also again executed as necessary.

As a processing timing of the calculating and storing processes of the tap coefficients during the use of the apparatus, a fluctuation of the transmission path characteristics due to a temperature change of the apparatus is considered. Therefore, it is also possible to count a use time and to perform the calculating and storing processes of the tap coefficients each time the use time reaches a predetermined time. As a retry process in the case where a read error often occurs during the use of the apparatus, the tap coefficients calculating and storing processes can be also performed to the track with a read error as a target.

In the above embodiment, the tap coefficients have been obtained by using the isolated waveform on a track unit basis of the disk medium. However, it is also possible to obtain the tap coefficients on a loop unit basis of a plurality of tracks and to commonly use them.

In the above embodiment, as shown in FIG. 1, all of the functions as formatters about the reading and writing operations have been provided on the drive controller 12 side. However, the invention can be also applied to the case where only an AGC amplifier and a write amplifier are provided on the drive controller 12 side, functions as a formatter section from the VFO circuit 58 to the address controller 68 are provided on the upper disk controller side, an analog read signal and an analog write signal are transmitted and received to/from the drive controller 12 side, and the intercode interference by the transversal filter is eliminated by the formatter section of the upper disk controller.

In such a case, the tap coefficients which have previously been calculated every track of the magnetic disk provided for each drive are stored in the non-volatile memory of the upper disk controller and the corresponding tap coefficients are read out and set in the reading operation.

According to the invention as described above, the isolated waveform is written on a track unit basis of the magnetic disk, the optimum tap coefficient is calculated from the read waveform of the isolated waveform by the zero focusing method or minimum square error method and is stored in the memory, and in the seeking operation associated with the reading operation, the corresponding tap coefficients are read out and set to the transversal filter. Thus, the equalization waveform from which the intercede interference components that are peculiar to the track were certainly eliminated is obtained, the Viterbi decoding is certainly executed, and the correct read data can be reconstructed. Further, by calculating the optimum tap coefficient while changing the number of taps of the transversal filter and by setting and using such an optimum tap coefficient in the reading operation, the optimum read waveform can be equalized by the elimination of the intercede interference components at a higher precision.

What is claimed is:

1. A disk apparatus comprising:

an analog/digital converter for sampling and quantizing a read signal read out from a disk medium at predetermined pulse intervals;

a transversal filter of a non-adaptive type into which tap coefficients are fixedly set and which is used for suppressing intercede interference components included in the quantized read signal of said analog/digital converter;

a Viterbi decoder for reconstructing bit data from an output signal of said transversal filter by a maximum likelihood detection;

a test pattern writing section for magnetically recording a predetermined test pattern into a preset region of each track of the disk medium by designating a head number and a track number prior to starting the use of the apparatus so that the magnetizing direction is only inverted once approximately halfway through the length of the preset region in a manner such that an isolated waveform can be obtained upon reading;

a test pattern reading section for reading out the test pattern written every track of the disk medium by said test pattern writing section and outputting a read signal including the isolated waveform;

an isolated waveform averaging section for obtaining an average isolated waveform after a plurality of said isolated waveforms of the read signals outputted a plurality of times by said test pattern reading section were quantized by said analog/digital converter;

a tap coefficient calculating section for calculating tap coefficients of said transversal filter in accordance with a zero focusing algorithm so as to minimize an absolute value sum of said intercode interference components included in said read signal which was read out by said test pattern reading section and quantized by said analog/digital converter;

a memory in which the tap coefficients calculated by said tap coefficient calculating section have been stored prior to use of the apparatus, and in correspondence to the track number and the head number used when said test pattern is written; and a tap coefficient setting section for reading out the corresponding tap coefficients from said memory based on the track number and the head number designated by a seek command when said disk medium is read out, and setting said tap coefficients to said transversal filter of said non-adaptive type before the completion of a seeking operations, wherein the tap coefficients are calculated using said isolated waveform of said read signal outputted by said test pattern reading section, said isolated waveform averaging section and said tap coefficient calculating section, and are stored into said memory at least when a power source of the apparatus is turned on.

2. An apparatus according to claim 1, wherein processes for calculating the tap coefficients from said isolated waveform of said read signal and storing them in said test pattern reading section and said tap coefficient calculating section are further executed when a power source of the apparatus is turned on, after the elapse of a predetermined use time of the apparatus, and/or when a read error occurs.

3. A disk apparatus according to claim 1 wherein said isolated waveform averaging section obtains an average isolated waveform for each track, and wherein said read signal includes the averaged isolated waveform.

4. A disk apparatus comprising:

an analog/digital converter for sampling and quantizing a read signal read out from a disk medium at predetermined pulse intervals;

a transversal filter of a non-adaptive type into which tap coefficients are fixedly set and which is used for suppressing intercode interference components included in the quantized read signal of said analog/digital converter;

a Viterbi decoder for reconstructing bit data from an output signal of said transversal filter by a maximum likelihood detection;

a test pattern writing section for magnetically recording a predetermined test pattern into a preset region of each track of the disk medium by designating a head number and a track number prior to starting the use of the apparatus so that the magnetizing direction is only inverted once approximately halfway through the length of the preset region in a manner such that an isolated waveform can be obtained upon reading;

a test pattern reading section for reading out the test pattern written every track of the disk medium by said test pattern writing section and outputting a read signal including the isolated waveform;

an isolated waveform averaging section for obtaining an averaged isolated waveform after a plurality of said isolated waveforms of the read signals outputted a plurality of times by said test pattern reading section were quantized by said analog/digital converter;

a tap coefficient calculating section for calculating tap coefficients of said transversal filter on the basis of the read signal which was read out by said test pattern reading section and quantized by said analog/digital converter;

a tap coefficient evaluating section for allowing the read signal of said isolated waveform to pass through said transversal filter in a state in which the tap coefficients calculated by said tap coefficient calculating section have been set to said transversal filter, for evaluating whether an output signal is proper or improper, and in the case where said output signal is improper, for increasing the number of taps of said transversal filter which are used for arithmetic operations of said tap coefficient calculating section, thereby calculating the tap coefficients;

a memory in which the tap coefficients which were evaluated to be proper by said tap coefficient evaluating section have been stored prior to use of the apparatus, and with the track number and the head number used when said test pattern is written; and a tap coefficient setting section for reading out the corresponding tap coefficients from said memory by said track number and head number designated by a seek command when said disk medium is read out, and setting said tap coefficients to said transversal filter of said non-adaptive type before the completion of a seeking operation, wherein the tap coefficients are calculated using said isolated waveform of said read signal outputted by said test pattern reading section, said isolated waveform averaging section, said tap coefficient calculating section, and said tap coefficient evaluating section, and are stored into said memory at least when a power source of the apparatus is turned on.

5. An apparatus according to claim 4, wherein the number of taps in said transversal filter can be selected in a range between a predetermined minimum number and a predetermined maximum number.

6. An apparatus according to claim 4, wherein said transversal filter has a predetermined number of taps which gives the maximum number of taps and sets a tap coefficient 0 to the taps which are not used and selects an arbitrary number of taps.

7. An apparatus according to claim 4, wherein the optimum number of taps of said transversal filter is set to 8 in the case where said Viterbi decoder reconstructs the bit data by a binary class-4 partial response maximum likelihood detection.

8. An apparatus according to claim 4, wherein the optimum number of taps of said transversal filter is set to 7 in the case where said Viterbi decoder reconstructs the bit data by an extended binary class-4 partial response maximum likelihood detection.

9. An apparatus according to claim 4, wherein said tap coefficient calculating section calculates the tap coefficients of said transversal filter in accordance with a zero focusing algorithm so as to minimize an absolute value sum of the intercode interference components included in said quantized isolated read signal.

10. An apparatus according to claim 4, wherein said tap coefficient calculating section calculates the tap coefficients of said transversal filter in accordance with a minimum square error algorithm to minimize a square sum of the intercode interference components included in said quantized isolated read signal.

11. An apparatus according to claim 4, wherein processes for calculating the tap coefficients from said isolated waveform of said read signal and storing them in said test pattern reading section, said tap coefficient calculating section, and said tap coefficient evaluating section are further executed when a power source of the apparatus is turned on, after the elapse of a predetermined use time of the apparatus, and/or when a read error occurs.

12. A disk apparatus according to claim 4 wherein said isolated waveform averaging section obtains an averaged isolated waveform for each track, and wherein said read signal includes the averaged isolated waveform.

13. A read waveform equalizing method in a magnetic disk apparatus comprising an analog/digital converter for sampling and quantizing a read signal read out from a disk medium at predetermined pulse intervals, a transversal filter of a non-adaptive type into which tap coefficients are fixedly set and which is used for suppressing intercode interference components included in the quantized read signal of said analog/digital converter, and a Viterbi decoder for reconstructing bit data from an output signal of said transversal filter by a maximum likelihood detection, wherein said method comprises:

a test pattern writing step of magnetically recording a predetermined test pattern into a predetermined region of each track of the disk medium designated by a head number and a track number prior to starting the use of the apparatus so that the magnetizing direction is only inverted once approximately halfway through the length of the predetermined region in a manner such that an isolated waveform can be obtained upon reading;

a test pattern reading step of reading out the test pattern written every track of the disk medium in said test pattern writing step and outputting a read signal including the isolated waveform;

an isolated waveform averaging step of obtaining an averaged isolated waveform after a plurality of said isolated waveforms of the read signals outputted a plurality of times by said test pattern reading step were quantized by said analog/digital converter;

a tap coefficient calculating step of calculating tap coefficients of said transversal filter in accordance with a zero focusing algorithm so as to minimize an absolute value sum of said intercode interference components included in the quantization read signal obtained by sampling the read signal read out in said test pattern reading step at said predetermined pulse intervals and by quantizing;

a tap coefficient storing step of storing the tap coefficients calculated in said tap coefficient calculating step into a memory prior to use of the apparatus, and by an address designation based on the track number used in said test pattern writing step; and a tap coefficient setting step of reading out the corresponding tap coefficients when the disk medium is read out during the use of the apparatus and setting said tap coefficient to said transversal filter of said non-adaptive type by the address designation of said memory based on the track number and the head number designated by a seek command before the completion of a seeking operation, wherein the tap coefficients are calculated using said isolated waveform of said read signal outputted by said test pattern reading step, said isolated waveform averaging step, and said tap coefficient calculating step, and are stored into said memory at least when a power source of the apparatus is turned on.

14. A read waveform equalizing method according to claim 13, wherein said isolated waveform averaging step obtains an averaged isolated waveform for each track, and wherein said read singnal includes the averaged isolated waveform.

15. A read waveform equalizing method in a disk apparatus comprising an analog/digital converter for sampling and quantizing a read signal read out from a disk medium at predetermined pulse intervals, a transversal filter of a non-adaptive type into which tap coefficients are fixedly set and which is used for suppressing intercode interference components included in the quantized read signal of said analog/digital converter, and a Viterbi decoder for reconstructing bit data from an output signal of said transversal filter by a maximum likelihood detection, wherein said method comprises:

a test pattern writing step of magnetically writing a predetermined test pattern into a predetermined region of each track of the disk medium designated by a head number and a track number prior to starting the use of the apparatus so that the magnetizing direction is only inverted once approximately halfway through the length of the predetermined region in a manner such that an isolated waveform can be obtained upon reading;

a test pattern reading step of reading out the test pattern written every track of the disk medium in said test pattern writing step;

an isolated waveform averaging step of obtaining an averaged isolated waveform after a plurality of said isolated waveforms of the read signals outputted a plurality of times by said test pattern reading step were quantized by said analog/digital converter;

a tap coefficient calculating step of sampling the read signal of the isolated waveform read out in said test pattern reading step at every predetermined period and quantizing, and calculating tap coefficients of said transversal filter on the basis of said quantized read signal;

a tap coefficient evaluating step of evaluating whether an output signal obtained by inputting said read signal of said test pattern to said transversal filter is proper or improper in a state in which the tap coefficients calculated in said tap coefficient calculating step have been set to said transversal filter and, in the case where said output signal is improper, calculating the tap coefficients in said tap coefficient calculating step in a state in which the number of taps of said transversal filter was increased;

a storing step of storing the tap coefficients evaluated to be proper in said tap coefficient evaluating step into a memory prior to use of the apparatus, and by an address designation based on the track number and said head number used when said test pattern is written; and a tap coefficient setting step of reading out the corresponding tap coefficients when the disk medium is read out during the use of the apparatus and setting said tap coefficients to said transversal filter by the address designation of said memory based on the track number and the head number designated by a seek command before the completion of a seeking operation, wherein the tap coefficients are calculated using said isolated waveform of said read signal outputted by said test pattern reading step, said isolated waveform averaging step, said tap coefficient evaluating step, and said tap coefficient calculating step, and are stored into said memory at least when a power source of the apparatus is turned on.

16. A method according to claim 15, wherein the number of taps of said transversal filter can be selected in a range of a predetermined minimum number and a predetermined maximum number.

17. A method according to claim 15, wherein said transversal filter has a predetermined number of taps which give the maximum number of taps, a tap coefficient 0 is set to the taps which are not used, and an arbitrary number of taps are selected.

18. A method according to claim 15, wherein in the case where the number of taps is an even number, an initial number of taps of said transversal filter is set to 8.

19. A method according to claim 15, wherein the optimum number of taps of said transversal filter is set to 8 in the case where said Viterbi decoder reconstructs the bit data by a binary class-4 partial response maximum likelihood detection.

20. A method according to claim 15, wherein the optimum number of taps of said transversal filter is set to 7 in the case where said Viterbi decoder reconstructs the bit data by an extended binary class-4 partial response maximum likelihood detection.

21. A method according to claim 15, wherein in said tap coefficient calculating step, the tap coefficients of said transversal filter are calculated in accordance with a minimum square error algorithm to minimize a square sum of the intercode interference components included in said quantized isolated read signal.

22. A read waveform equalizing method according to claim 15, wherein said isolated waveform averaging step for obtaining an averaged isolated waveform for each track, and wherein said read signal includes the averaged isolated waveform.

* * * * *

UNITED STATES PATENT AND TRADEMARK OFFICE
CERTIFICATE OF CORRECTION

PATENT NO. : 5,886,844

DATED : March 23, 1999

INVENTOR(S) : Shoichi Shimizu

It is certified that error appears in the above-identified patent and that said Letters Patent is hereby corrected as shown below:

Column 1, line 20, before "future" insert --the--.

Column 1, line 31, delete "a" (second occurrence).

Column 1, line 31, change "of" to --to--.

Column 1, line 33, before "future" insert --the--.

Column 1, line 38, change "Hitherto" to --Thus--.

Column 1, line 53, change "are" to --is--.

Column 2, lines 7 and 8, delete "is also" and insert --also is--.

UNITED STATES PATENT AND TRADEMARK OFFICE
CERTIFICATE OF CORRECTION

PATENT NO. : 5,886,844

DATED : March 23, 1999

INVENTOR(S) : Shoichi Shimizu

It is certified that error appears in the above-identified patent and that said Letters Patent is hereby corrected as shown below:

Column 2, line 36, change "Hitherto" to --Thus--.

Column 2, line 58, delete "is" (first occurrence).

Column 2, line 66, after "In" insert --the--.

Column 3, line 21, after "in" insert --the--.

Signed and Sealed this

Seventeenth Day of August, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,886,844
DATED : March 23, 1999
INVENTOR(S) : Shoichi Shimizu

It is certified that error appears in the above-identified patent and that said Letters Patent is hereby corrected as shown below:

Column 1, line 60, delete "t" and insert --$\tau$-- therefor

Column 3, line 43, delete "intercede" and insert --intercode-- therefor

Column 4, line 14, delete "intercede" and insert --intercode-- therefor

Column 4, line 15, delete "components-" and insert --components-- therefor

Column 6, lines 14-15, delete "intercede" and insert --intercode-- therefor

UNITED STATES PATENT AND TRADEMARK OFFICE
CERTIFICATE OF CORRECTION

PATENT NO.  : 5,886,844
DATED       : March 23, 1999
INVENTOR(S) : Shoichi Shimizu It is certified that error appears in the above-identified patent and that said Letters Patent is hereby corrected as shown below:

Column 6, line 21, delete "intercede" and insert --intercode-- therefor

Column 7, line 46, "20" should not be bold

Column 10, line 20, delete "c-to" and insert --c-3 to-- therefor

Column 10, line 49, delete "intercede" and insert --intercode-- therefor

Column 11, line 60, delete "precision" and insert --precisions-- therefor

UNITED STATES PATENT AND TRADEMARK OFFICE
CERTIFICATE OF CORRECTION

| | | |
|---|---|---|
| PATENT NO. : | 5,886,844 | Page 3 of 5 |
| DATED : | March 23, 1999 | |
| INVENTOR(S) : | Shoichi Shimizu | |

It is certified that error appears in the above-identified patent and that said Letters Patent is hereby corrected as shown below:

Column 12, line 3, delete "si" and insert

--s1-- therefor

Column 12, line 4, "0" should not be in bold

Column 12, line 16, delete "d = cx×is" and insert --d = c × x is-- therefor

Column 12, line 18, delete "$C_{-3}$ to $C_3$" and insert --$c_{-3}$ to $c_3$-- therefor Column 12, line 57, delete "intercede" and insert --intercode-- therefor Column 14, line 2, delete "abovementioned"

UNITED STATES PATENT AND TRADEMARK OFFICE
CERTIFICATE OF CORRECTION

PATENT NO. : 5,886,844
DATED : March 23, 1999
INVENTOR(S) : Shoichi Shimizu

It is certified that error appears in the above-identified patent and that said Letters Patent is hereby corrected as shown below:

Column 14, line 33, delete "$C_{-4}, C_4$" and insert --$c_{-4}, c_4$-- therefor Column 14, line 35, "8" should not be in bold Column 14, line 36, delete "$C_{-5}$ and $C_5$" and insert --$c_{-5}$ and $c_5$-- therefor Column 16, line 45, delete "intercede" and insert --intercode-- therefor Column 16, line 53, delete "intercede" and insert --intercode-- therefor

UNITED STATES PATENT AND TRADEMARK OFFICE
CERTIFICATE OF CORRECTION

PATENT NO. : 5,886,844
DATED : March 23, 1999
INVENTOR(S) : Shoichi Shimizu

It is certified that error appears in the above-identified patent and that said Letters Patent is hereby corrected as shown below:

Column 16, line 62, delete "intercede" and insert --intercode-- therefor

Column 17, line 35, delete "operations" and insert --operation-- therefor

Column 17, line 51, delete "average" and insert --averaged-- therefor

Column 20, line 22, delete "singnal" and insert --signal-- therefor

Signed and Sealed this

Fourteenth Day of December, 1999

Attest:

Q. TODD DICKINSON

Attesting Officer

Acting Commissioner of Patents and Trademarks